US 6,498,863 B1

(12) United States Patent
Gaidoukevitch et al.

(10) Patent No.: US 6,498,863 B1
(45) Date of Patent: Dec. 24, 2002

(54) METHOD, SYSTEM, AND PRODUCT FOR ANALYZING A DIGITIZED IMAGE OF AN ARRAY TO CREATE AN IMAGE OF A GRID OVERLAY

(75) Inventors: Yuri C. Gaidoukevitch, Leiderdorp (NL); Kevin W. Ryan, Silver Spring, MD (US); Dean E. Sequera, Kensington, MD (US)

(73) Assignee: Media Cybernetics Inc., Silver Spring, MD (US)

( * ) Notice: Subject to any disclaimer, the term of this patent is extended or adjusted under 35 U.S.C. 154(b) by 13 days.

(21) Appl. No.: 09/665,665

(22) Filed: Sep. 20, 2000

(51) Int. Cl.[7] .................................................. G06K 9/34
(52) U.S. Cl. ....................... 382/173; 382/133; 382/280; 382/288
(58) Field of Search ................................. 382/128–134, 382/141, 145, 151, 153, 168–172, 280, 286, 291, 294, 288, 173, 203, 261, 266; 348/86–95, 125–134; 250/559.05; 702/94

(56) References Cited

U.S. PATENT DOCUMENTS

| | | | |
|---|---|---|---|
| 5,541,417 A | 7/1996 | Xiong et al. ............ 250/559.05 |
| 5,671,165 A | 9/1997 | Tomimatu ..................... 702/94 |
| 5,696,835 A | 12/1997 | Hennessey et al. ......... 382/141 |
| 5,737,441 A | 4/1998 | Nishi .......................... 382/151 |
| 5,787,190 A | 7/1998 | Peng et al. ................. 382/145 |
| 5,825,908 A * | 10/1998 | Pieper et al. ............... 382/131 |
| 5,825,913 A | 10/1998 | Rostami et al. ............ 382/151 |
| 5,974,165 A * | 10/1999 | Giger et al. ................ 382/132 |
| 5,978,498 A | 11/1999 | Wilhelm et al. ............ 382/133 |
| 6,016,358 A | 1/2000 | Balamurugan ............... 382/151 |
| 6,072,915 A | 6/2000 | Tanaka ....................... 382/287 |
| 6,118,893 A | 9/2000 | Li ............................... 382/150 |
| 6,128,403 A | 10/2000 | Ozaki ......................... 382/145 |
| 6,142,681 A | 11/2000 | Gulati ........................... 395/13 |
| 6,144,758 A | 11/2000 | Fukushima et al. ......... 382/128 |
| 6,151,406 A | 11/2000 | Chang et al. ............... 382/147 |
| 6,154,561 A | 11/2000 | Pratt et al. .................. 382/141 |
| 6,154,566 A | 11/2000 | Mine et al. ................. 382/219 |
| 6,215,892 B1 * | 4/2001 | Douglass et al. ........... 382/128 |
| 6,345,115 B1 * | 2/2002 | Ramm et al. ............... 382/133 |
| 6,349,144 B1 * | 2/2002 | Shams ......................... 382/129 |

OTHER PUBLICATIONS

"GeneChip Probe Array Synthesis," Affymetrix, Inc., Mar. 17, 1998, http://www.affymetrix.com/technology/synthesis.html, last visited Mar. 23, 2000, 2 pages.

ImaGene® 3.0 BioDiscovery Inventing Expression Bioinformatics, BioDiscovery.com, http://www.biodiscovery.com/imagene.html, last visited Mar. 27, 2000, 4 pages.

"Evaluating Image Analysis Systems," Imaging Research, Inc., 2000, http://www.imaging.brocku.ca/applications/evaluating.htm, last visited Mar. 23, 2000, 16 pages.

"Gene Pix 4000A: Integrated Microarray Scanner and Analysis Software," Axon Instruments, Inc., 2000, http://www.axon.com/GN GenePix4000.html, last visited Mar. 27, 2000, 12 pp.

(List continued on next page.)

*Primary Examiner*—Leo Boudreau
*Assistant Examiner*—Ishrat Sheral
(74) *Attorney, Agent, or Firm*—Sterne, Kessler, Goldstein&Fox P.L.L.C.

(57) ABSTRACT

A method, system, and product for analyzing a digitized image of an array to create an image of a grid overlay. The method comprising the steps of locating the center of each object on the array, determining a standard shape and size for the objects, and creating a final image of the grid overlay. Preliminary procedures can be used to normalize the image so that optimal results can be obtained. Sub-grids can be identified and objects repositioned within their corresponding sub-grids. Noise can be removed by filtering processes based on object size, intensity, and location.

45 Claims, 35 Drawing Sheets

OTHER PUBLICATIONS

"Microarray Technology: Seeking Patterns in Megadata," Ruth Alscher, 1999, *http://www.bsi.vt.edu/ralscher/qridit/intro ma.htm*

"What is Image Analysis?," Imaging Reasearch, Inc., 2001 *http://www.imagingresearch.com/applications/what is.htm*, last visited Jun. 26, 2001, 17 pages.

"Microarray Project (uAP)," Division of Intramural Research, *http://www.nhgri.nih.gov/DIR/LCG/15K/HTML/img analysis.html*, last visited Jun. 26, 2001, 6 pages.

"ScanArray™Acquisition Software for Windows NT," Packard Instrument Company, 2000, *http://www.packard-biochip.com/products/scan soft.htm*, last visited Jun. 26, 2001, 8 pages.

Sinclair, Bob "Everything's Great When It Sits on a Chip: A Bright Future for DNA Arrays," The Scientist, Inc., vol. 13, No. 11, May 24, 1999, *http://www.the–scientist.library.upenn.edu/yr1999/may/profile1 990524.html*, last visited May 26, 2000, 7 pages.

Nadon, Robert *et al.*, "Statistical Inference Methods for Gene Expression Arrays," Imaging Research, Inc. 2001, 12 pages.

* cited by examiner

CONT. ON FIG.32B

METHOD, SYSTEM, AND PRODUCT FOR ANALYZING A DIGITIZED IMAGE OF AN ARRAY TO CREATE AN IMAGE OF A GRID OVERLAY

BACKGROUND OF THE INVENTION

1. Field of the Invention

The present invention relates generally to analysis of digitized images of arrays.

2. Discussion of the Related Art

Array technology has dramatically expanded the ability of researchers to perform a variety of biotechnological operations. It has proven especially valuable in applications for DNA genotyping and gene expression. By supporting simultaneous examination of up to thousands of samples, the method enables researchers to gain a better overall picture than what may be obtained from a traditional "one gene in one experiment" approach. Array technology also reduces the time and the volume of materials needed for an experiment. Where previously a researcher might screen an array of unknowns with a defined probe, array technology facilitates a reverse approach. Defined DNA fragments can be affixed to known positions in an array and probed with an unknown sample.

Often, a distinction is made in array technology between microarrays and macroarrays. Objects on a microarray typically have diameters of less than 200 microns, while those on a macroarray are usually larger than 300 microns. Arrays may use glass slides, micromirrors, or semiconductor chips as substrate materials. The shape, alignment, and density of objects on an array may be controlled by a variety of methods. Robotic systems that precisely deposit small quantities of solution in an ordered configuration on the substrate material are common. Photolithographic techniques, similar to those used in the semiconductor electronics industry, are also used. Masks define activation sites where chemical coupling may occur. Repeating this process to build upon previously exposed sites allows for the formation of various gene sequences at different positions throughout the array. Alternatively, a solution of biomaterial may be spread across the substrate while specific sites on the chip are electrically activated to induce chemical bonding at those locations. Often a high density array is partitioned into sub-arrays to distinguish various aspects of an experiment, to separate different tests, or due to mechanical limitations in the means by which samples are applied to the substrate.

In a typical experiment, the array is exposed to a chemical sample to induce hybridization between array object and sample compounds. A variety of detection strategies may be used to locate the specific sites on the array where hybridization has occurred. These include use of fluorescent dyes, autoradiography, radiolabels, bioelectronic detection (observance of electron transfer reactions between samples and the substrate), and laser desorption mass spectrometry. Signals emitted from objects via detection media provide information about the reactions. Signals may be measured for absolute intensities or, in the case where different colored dyes are used to detect the degree of presence of different compounds, for ratios of intensities within specific frequencies.

Measurement and analysis of signals emitted from an array of objects usually involves examination of an image of the array. The labeled samples are excited and a detector system captures an image of the emitted energy. Accuracy of subsequent signal analysis is heavily dependent on the parameters of the detector system and its ability to reproduce faithfully the image of the array. Detector pixels need to be sufficiently small so that representation of each object includes enough pixels to support statistical analysis of the intensity of the object.

In addition to issues with image accuracy, signal measurement and analysis may be further complicated by the introduction of noise onto either the array or the image. Noise may arise from variations in sources used to excite labeled samples, fluorescence scattered by adjacent samples ("blooming" effect), dust and other impurities on the array, and other sources. Signal strength may be limited by the size of the objects, irregularities in preparing sites on the array, shortfalls of sample compounds deposited at certain locations, uneven application of detection media, and other causes. Fluctuations in the intensity of energy emitted by the background of the image can cloud the distinction between signal and noise objects and add to the difficulty of image analysis.

Image analysis is often aided by use of a grid overlay to assist the researcher in locating signal objects and identifying noise. However, alignment of the grid overlay often must be adjusted for the particular array, especially where a standard grid overlay must be modified to create sub-grids that correspond to underlying sub-arrays. When done manually, grid alignment can take days. Additionally, errors in human judgment in performing this process can substantially diminish the likelihood that other researchers will be able to reproduce the results of an experiment.

Digital image processing software has helped to mitigate some of the concerns with matching the grid overlay to the array. Orientation markers included on array substrates and captured in the image can be used to align grid overlays on the image. A typical algorithm to distinguish sub-grids detects signals from objects, determines the "center of mass" for each object, identifies corner coordinates for each sub-array, and aligns sub-grids accordingly.

Measurement of background intensity usually involves distinguishing background pixels from object pixels. Often it is assumed that those pixels nearest the edge of the image represent the background of the image. However, this is not always the case, particularly for high density arrays. Where an image consists of relatively low intensity objects against a high intensity background, a histogram of the image will likely be unimodal in character and provide useful information for distinguishing background pixels from object pixels. With an accurate characterization of background intensity, objects on the image may be identified. Often, objects are defined simply as those pixels with a value of intensity greater than a multiple of the standard deviation of the distribution of intensities for background pixels added to the mean value of this distribution.

Each of these methods for processing the digital image of an array has benefits and disadvantages. While the processes described in the current art have admirably employed statistical tools in the course of their analyses, they have not included other mathematical methods, such as evaluations of fourier transform spectrums, in their overall schemes. Also, current methods have taken a "background first" approach in which objects are defined in terms of "not being background". On whole, development within the art has tended to focus on identifying and correcting individual impediments to accurate image analysis. What has been needed is a comprehensive scheme to integrate a variety approaches into a single optimal method that can be used with any array regardless of object size or density, corrects the orientation of the array on the image, flattens fluctuations in background intensity, removes noise, and adjusts its efficacy to variations in background and noise intensity.

SUMMARY OF THE INVENTION

The present invention provides a method, system, and product for analyzing a digitized image of an array to create an image of a grid overlay. It is designed to function on images of arrays of various sizes and densities and with different levels of noise intensity. In general, the invention locates the center of each object on the array, determines a standard shape and size for the objects, and creates a final image of the grid overlay. In a preferred embodiment, preliminary procedures normalize the image so that optimal results can be obtained, sub-grids are identified and objects are repositioned within their corresponding sub-grids, and noise is removed by filtering processes based on object size, intensity, and location. Unlike prior art approaches, the present invention takes an "objects first" approach by initially identifying objects on the image and then defining the background in terms of "not being objects".

Accurately ascertaining the location, size, and shape of objects on an array is critical for precise measurement of array data. The present invention advances the state of the art by eliminating the need for orientation markers, by incorporating full array and frequency analysis operations into the process in addition to local measurement techniques, and by reducing the requirement for manual intervention and the errors it introduces. The present invention enables objects on an array to be characterized more quickly, more consistently, and more accurately than the prior art.

In a preferred embodiment, preliminary procedures normalize the image so that optimal results can be obtained. First, a determination is made as to whether the image is negative or positive. A histogram is prepared of the original image and a third order moment of the histogram is calculated. If the third order moment is negative, the image is converted to positive. After establishing a positive image, the background of the image is corrected to reduce fluctuations in its intensity. Object pixels are distinguished from background pixels and the values of the background pixels are set equal to a common value. On a background-corrected image, the orientation of the array is adjusted so that the array aligns with the borders of the image. A desired angle of orientation between the rows and columns of the array and the boundaries of the image is selected. A fast fourier transform spectrum is created for the image. The maximum frequency is determined from the fast fourier transform spectrum and used to calculate the actual angle of orientation between the rows and columns of the array and the boundaries of the image. Thereafter, the image is rotated to a selected desired angle of orientation. This same fast fourier transform spectrum can be used to measure the level of noise on the image. (Therefore, these two procedures can be performed in tandem.) In measuring the level of noise on the image, an average of the pixel values is determined for a middle portion of one of the four quadrants of the fast fourier transform spectrum. With this average a threshold noise level is set for use in subsequent filtering processes.

These preliminary procedures create an intermediate image that will optimize the results of subsequent filtering processes. Because the present invention is designed to function on images of arrays of various sizes and densities, filter size parameters, based on the size of objects on the array, are calculated. The image is lowpass filtered in one dimension to create an image of linear bands. A line of pixels is formed substantially perpendicular to these linear bands. A profile is developed of the line of pixels and a fast fourier transform spectrum is prepared for the profile. The maximum frequency is determined from the fast fourier transform spectrum and used to determine a filter size parameter appropriate for the size of the objects on the array. The same process is repeated for the other dimension. In conjunction with the procedure for calculating filter size parameters, boundaries for the array are defined to prevent the inclusion of background pixels located on the outer edges of the image in subsequent filtering processes.

Once preliminary procedures have been completed, single pixel centers of objects are located through a series of filtering processes that also serves to remove noise based on object size and intensity. Using these single pixel centers, horizontal and vertical polynomial segments are created that approximate the lines that pass through the single pixel centers. Polynomial segments are used in recognition of the possibility that the single pixel centers may not lie on the same line. Therefore, defining the positions of the single pixel centers as points on a polynomial function increases the accuracy of the location of objects on the final grid overlay. Additionally, the spacing between polynomial segments is used to identify sub-grids within the array. Once sub-grids are identified, first, single pixel centers are aligned and, then, objects are repositioned with respect to their corresponding sub-grids. By comparing single pixel centers with objects, a final effort is made to remove noise based on object location on the image. Using the remaining objects, a standard shape and size is determined for objects and the final image of the grid overlay is created in which each object has said standard shape and size and is positioned in relation to its corresponding said center.

Further embodiments, features, and advantages of the present invention, as well as the structure and operation of the various embodiments of the present invention, are described in detail below with reference to the accompanying figures.

BRIEF DESCRIPTION OF THE FIGURES

The present invention will now be described with reference to the accompanying figures, wherein.

Figure 1:
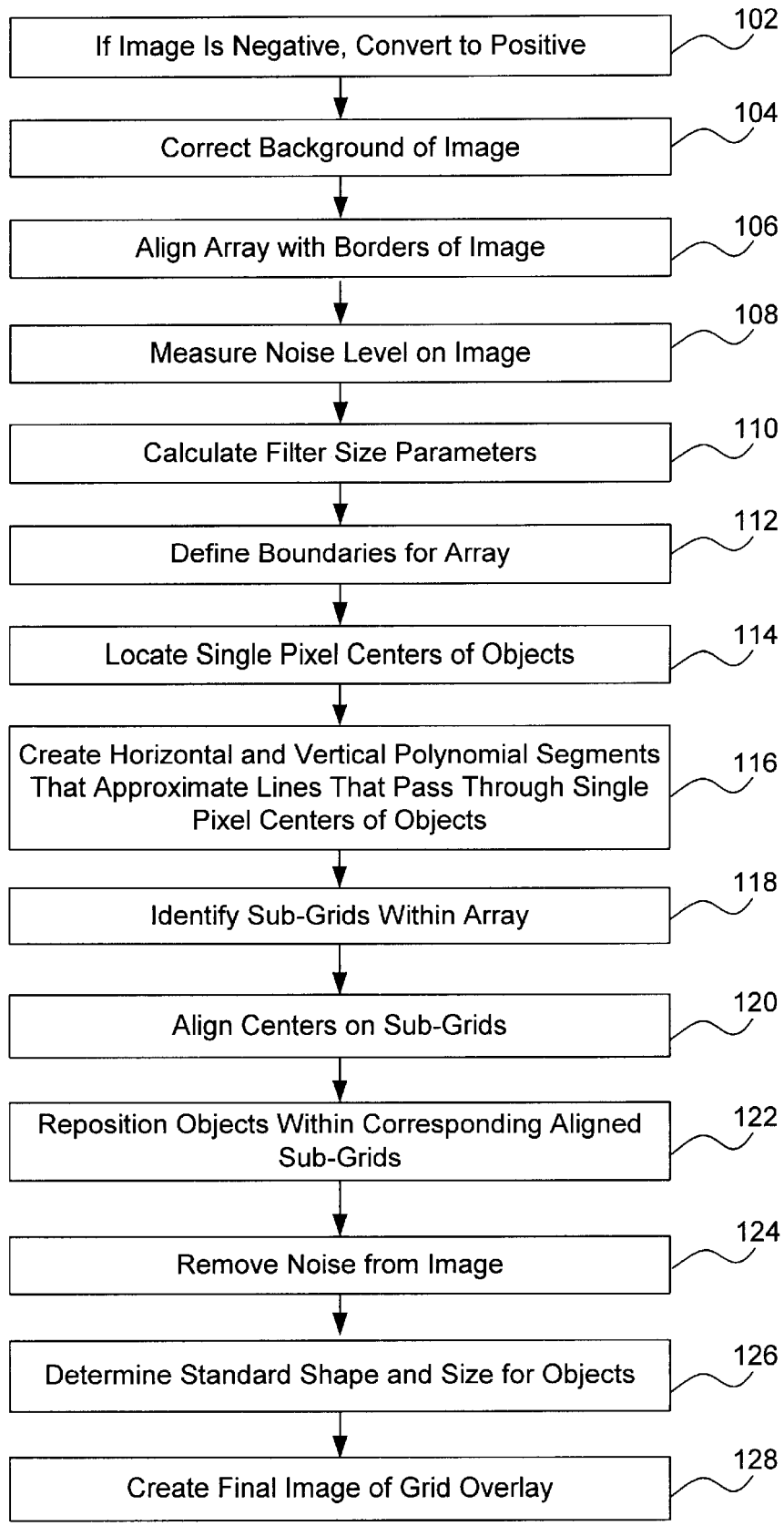
FIGS. 1, 4, 8, 11, 13, 14, 18, 20A, 20B, 22A, 22B, 24, 25A, 25B, 27, 28A, 28B, and 30 show operational flow diagrams according to a preferred embodiment of the present invention.

The preferred embodiment of the invention is described with reference to the figures where like reference numbers indicate identical or functionally similar elements. Also in the figures, the left most digit(s) (either the first digit or first two digits) of each reference number identify the figure in which the reference number is first used.

DETAILED DESCRIPTION OF THE PREFERRED EMBODIMENTS

Overview

The present invention provides a method, system, and product for analyzing a digitized image of an array to create an image of a grid overlay. Array technology has dramatically expanded the ability of researchers to perform a variety of biotechnological operations. In a typical experiment, the array is exposed to a chemical sample to induce hybridization between array object and sample compounds. A variety of detection strategies may be used to locate the specific sites on the array where hybridization has occurred. Signals emitted from objects via detection media provide information about the reactions. Measurement and analysis of signals emitted from an array of objects usually involves examination of an image of the array. Accuracy of signal analysis is heavily dependent on the parameters of the detector system and its ability to reproduce faithfully the image of the array. Signal measurement and analysis may be further complicated by the introduction of noise onto either the array or the image. For these reasons, image analysis is often aided by use of a grid overlay to assist the researcher in locating signal objects and identifying noise. Often, the alignment of the grid overlay must be adjusted for the particular array, especially where a standard grid overlay must be modified to create sub-grids that correspond to underlying sub-arrays.

Accurately ascertaining the location, size, and shape of objects on an array is critical for precise measurement of array data. The present invention advances the state of the art by eliminating the need for orientation markers, by incorporating full array and frequency analysis operations into the process in addition to local measurement techniques, and by reducing the requirement for manual intervention and the errors it introduces. The present invention enables objects on an array to be characterized more quickly, more consistently, and more accurately than the prior art.

The present invention is designed to function on images of arrays of various sizes and densities and with different levels of noise intensity. In its most basic form, the invention locates the center of each object on the array, determines a standard shape and size for the objects, and creates a final image of the grid overlay. In a preferred embodiment, preliminary procedures normalize the image so that optimal results can be obtained, sub-grids are identified and objects are repositioned within their corresponding sub-grids, and noise is removed by filtering processes based on object size, intensity, and location. Unlike prior art approaches, the present invention takes an "objects first" approach by initially identifying objects on the image and then defining the background in terms of "not being objects".

FIG. 1 shows a high level operational block diagram of a preferred embodiment of the present invention and is useful for gaining an overview understanding of the present invention. In a preferred embodiment, a determination is initially made as to whether the image is negative or positive. If the image is negative, it is converted to positive. (See step 102 of FIG. 1.) After establishing a positive image, the background of the image is corrected to reduce fluctuations in its intensity, the orientation of the array is adjusted so that the array aligns with the borders of the image, and a measurement is made of the noise level on the image. (See steps 104 through 108 of FIG. 1.) These preliminary procedures create an intermediate image that will optimize the results of subsequent filtering processes. Because the present invention is designed to function on images of arrays of various sizes and densities, filter size parameters, based on the size of objects on the array, must be calculated. (See step 110 of FIG. 1.) Additionally, boundaries for the array are defined to prevent the inclusion of background pixels located on the outer edges of the image in subsequent filtering processes. (See step 112 of FIG. 1.)

Once preliminary procedures have been completed, single pixel centers of objects are located through a series of filtering processes that also serves to remove noise based on object size and intensity. (See step 114 of FIG. 1.) Using these single pixel centers, horizontal and vertical polynomial segments are created that approximate the lines that pass through the single pixel centers. Polynomial segments are used in recognition of the possibility that the single pixel centers may not lie on the same line. Therefore, defining the positions of the single pixel centers as points on a polynomial function increases the accuracy of the location of objects on the final grid overlay. (See step 116 of FIG. 1.) Additionally, the spacing between polynomial segments is used to identify sub-grids within the array. Once sub-grids are identified, first, single pixel centers are aligned and, then, objects are repositioned with respect to their corresponding sub-grids. (See steps 118 through 122 of FIG. 1.) By comparing single pixel centers with objects, a final effort is made to remove noise based on object location on the image. (See step 124 of FIG. 1.) Using the remaining objects, a standard shape and size is determined for objects and the final image of the grid overlay is created in which each object has said standard shape and size and is positioned in relation to its corresponding said center. (See steps 126 and 128 of FIG. 1.)

Nomenclature

The present invention provides a method, system, and product for analyzing a digitized image of an array to create an image of a grid overlay.

An "array" is a rectangular arrangement of sample sites on a substrate. Often a high density array is partitioned into sub-arrays to distinguish various aspects of an experiment or to separate different tests. A "sub-array" is a rectangular arrangement of sample sites wholly within an array and distinguishable from other sub-arrays by a variation in the spacing between sample sites.

To aid in analyzing the results of reactions at sample sites on the array, a digitized image of the array is produced. A digitized image, or "image", reproduces the two dimensional configuration of sample sites on the array. Numerical values are assigned to picture elements, "pixels", on the image at positions that correspond to the same position on the array. These numerical values represent the intensity of energy emitted at the corresponding position on the array. Where an array includes sample sites arranged on a substrate, an image appears as "objects" arranged against a "background". An image may be either a positive image or a negative image. In a "positive image", pixels representing objects have assigned values greater than values assigned to pixels representing background; in a "negative image", the background pixels have assigned values greater than the values assigned to object pixels.

In digitized form, an image may be subjected to digital image processing. "Digital image processing" involves a variety of operations that may be performed on the pixels that make up the image. In the course of these operations, an "intermediate image" may be produced. Intermediate images may or may not be displayed for viewing by the user and may or may not be stored for subsequent processing.

In addition to objects and background, an image usually includes noise. "Noise" is represented by pixels that have assigned values different from values assigned to background pixels but are located at positions that do not correspond to reaction sites on the array. Noise may be introduced into the image by a variety of means.

The present invention serves to counter the effects of noise and other distortions that are introduced onto the array or into the image and which impede the ability of the user to analyze the results of reactions at sample sites. The present invention presumes that, prior to the experiment, the sample sites were of a standard shape, size, and arrangement. The present invention serves to reproduce this standard shape, size, and arrangement by analyzing the digitized image to create an image of a grid overlay, or grid. A "grid" consists of outlines of objects of standard shape and size arranged on the image to match the arrangement of sample sites on the array. A grid overlay, superimposed on the image, aids the user in analyzing the image.

Digital image processing is accomplished primarily through the use of digital image filters, or filters. A "filter" is sized in two dimensions and encloses a certain number of pixels upon which a specific process is performed. Depending on the type of filter, the process performed may be in one or both dimensions.

The image may be analyzed to discern the frequency of values repeating in pixels along one of the dimensions enclosed by the filter. A "lowpass filter" processes the image by reducing the values of those pixels, within the filter, that have values that recur at high frequencies. This has the effect of blurring the image along the dimension being filtered. A lowpass filter is assigned an "upper cutoff frequency" to distinguish the frequency above which reductions in pixel values occur. A "bandpass filter" performs a similar process but also includes a "lower cutoff frequency" to distinguish the frequency below which reductions in pixel values occur. This has the effect of sharpening the image along the dimension being filtered.

When an image is filtered based on "threshold" values, minimum and maximum pixel values are selected and pixel with values that do not fall in between the selected minimum and maximum values are assigned other values.

Objects on an image may be dilated in one or both dimensions. When an object is "dilated", the values assigned to pixels at the edge of an object are copied into pixels beyond the edge of the object along the dimension being dilated. This has the effect of enlarging the object in that dimension. When an object is dilated in both dimensions, the process strives to retain the shape of the object. This is done with a filter known as a "circle kernel". Alternatively, a "skeletal image" may be created by using a thinning filter. With a "thinning filter", values assigned to pixels at the edge of an object are copied into pixels beyond the edge of the object along both dimensions. This has the effect of enlarging the object in two perpendicular dimensions without regard for retaining the shape of the object. Finally, an object may be reduced in size with a "reduce filter" or a "euclidean filter".

Some types of digital image processing involve combining two images in some manner to produce another image. To "add" two images, the values assigned to pixels at corresponding locations on the two images are first halved and then added together to produce a "sum image". Likewise, to "subtract" one image from another, the values assigned to pixels on the two images are first halved and then the pixel values from one image are subtracted from pixel values at corresponding locations on the other image to produce a "difference image". Images may also be combine via a Boolean AND operation. A "Boolean AND" operation involves comparing the values assigned to pixels at corresponding locations on two images. If the assigned values at the corresponding locations are equal, this value is assigned to the pixel at that location in a "logic output" image; otherwise the pixels on the logic output image are assigned another value.

Because arrays often are partitioned into sub-arrays, creating the grid must account for the position of "sub-grids" so that the positions of object outlines on the grid match the arrangement of sample sites within sub-arrays on the array.

A graphical user interface provides a means for the user to control portions of the process. A "graphical user interface" is distinguished by the use of forms and icons that are displayed on a computer screen and serve to guide the user in selecting options for use in the process. A "dialog box" is a space on a form on a graphical user interface where a user may either enter information for use in portions of the process or observe the results of portions of the process. Where portions of the process are performed automatically, the user may "edit" the results. This includes actions ranging from merely confirming to significantly altering the results. Other techniques for user alteration or manipulation of data, results, or processes are contemplated by the present invention.

Operation

Figure 14:
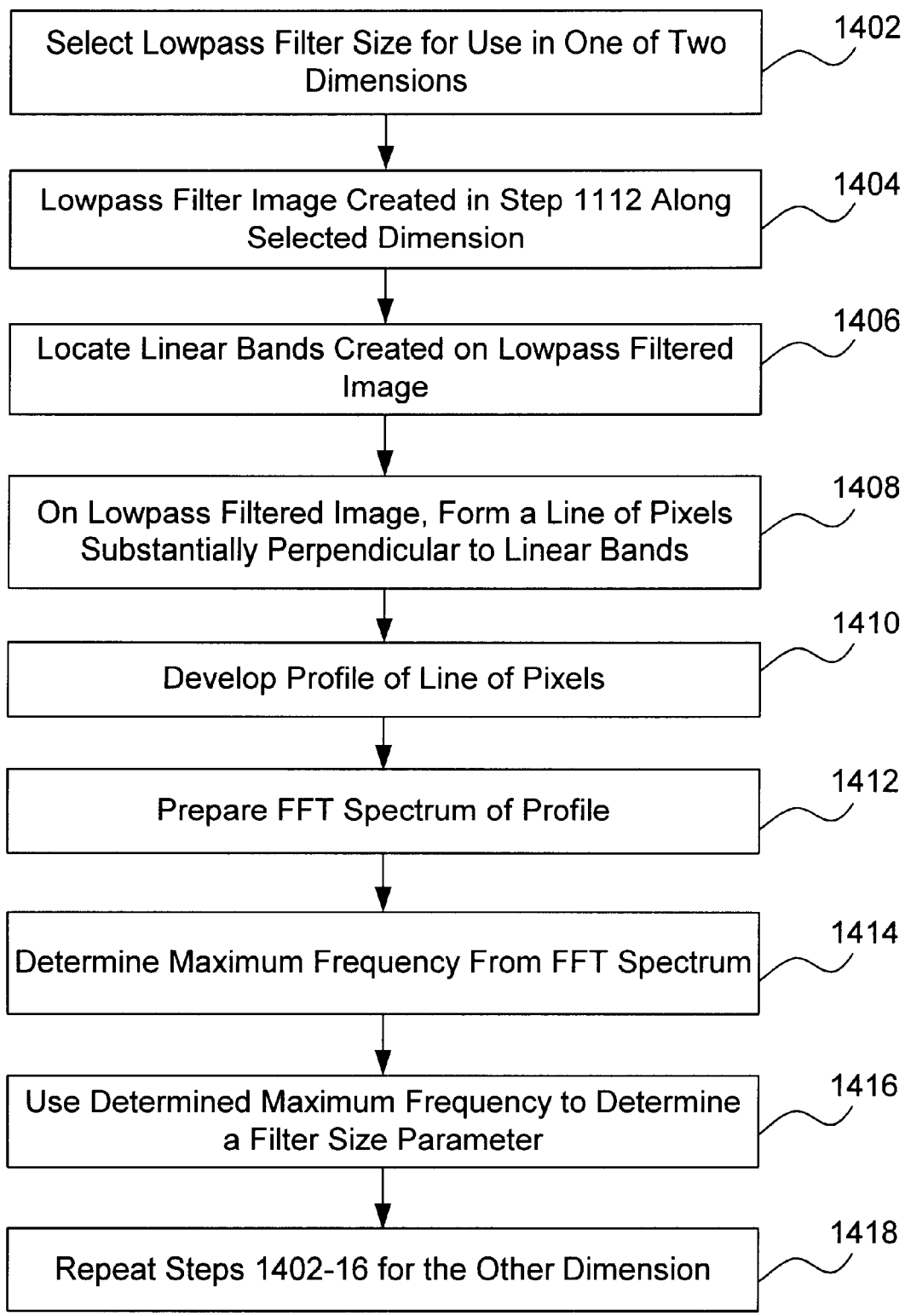
Figure 15:
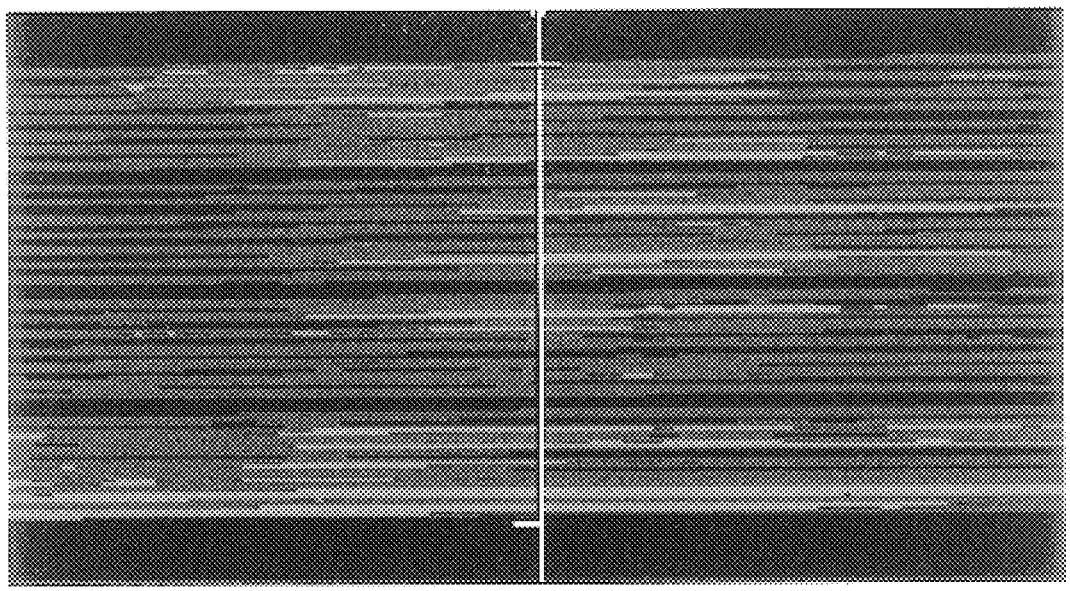
FIG. 15, 23, and 26 show intermediate images used to divine parameters, according to embodiments of the present invention, for the grid overlay.
Figure 22A:
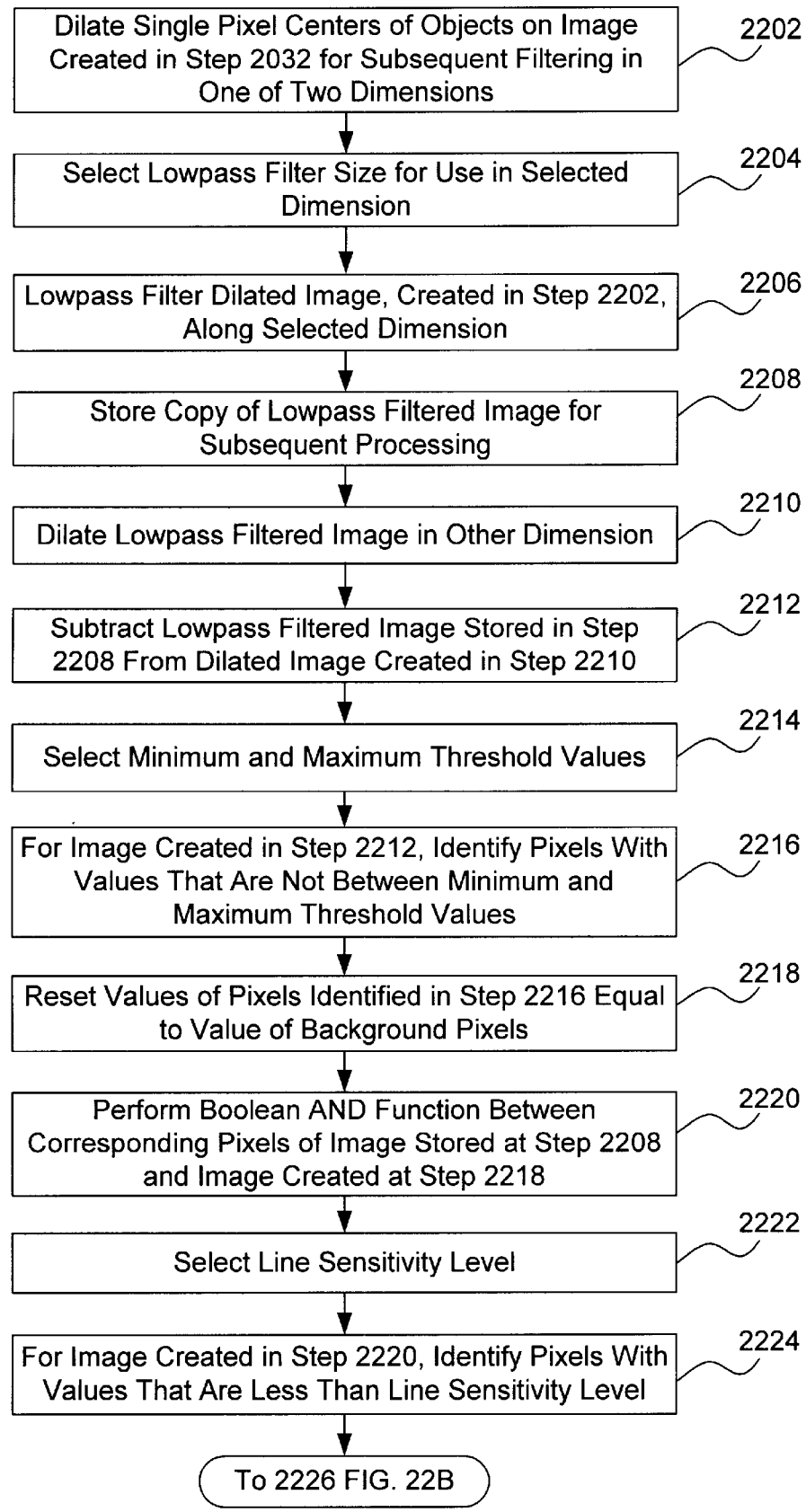
Figure 22B:
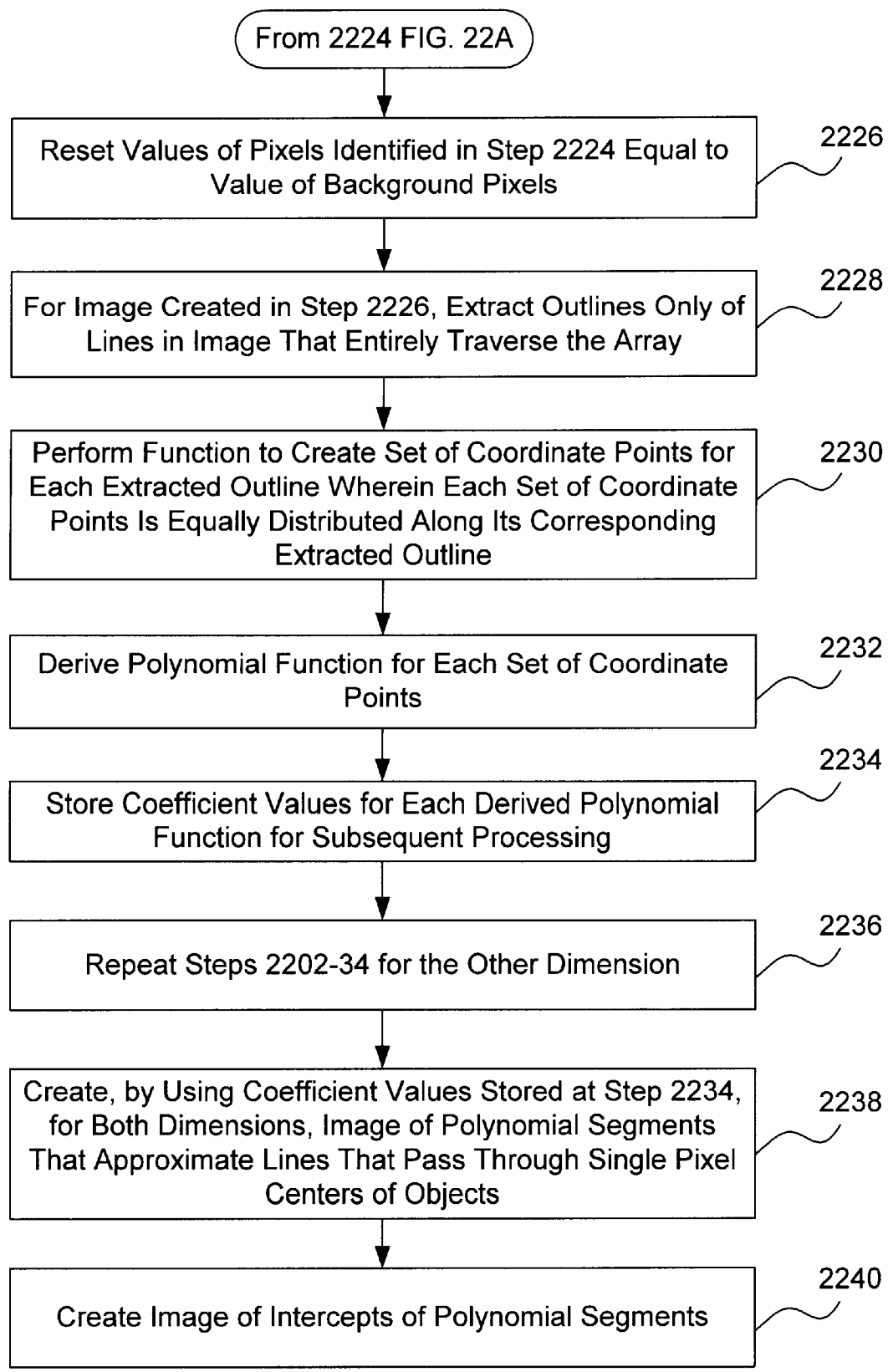
Figure 23:
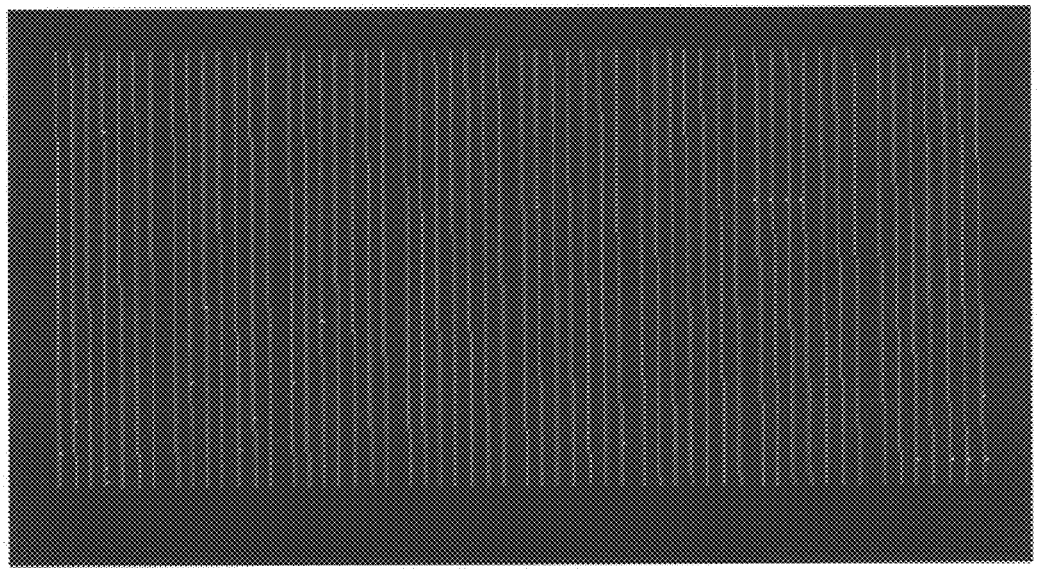
Figure 25A:
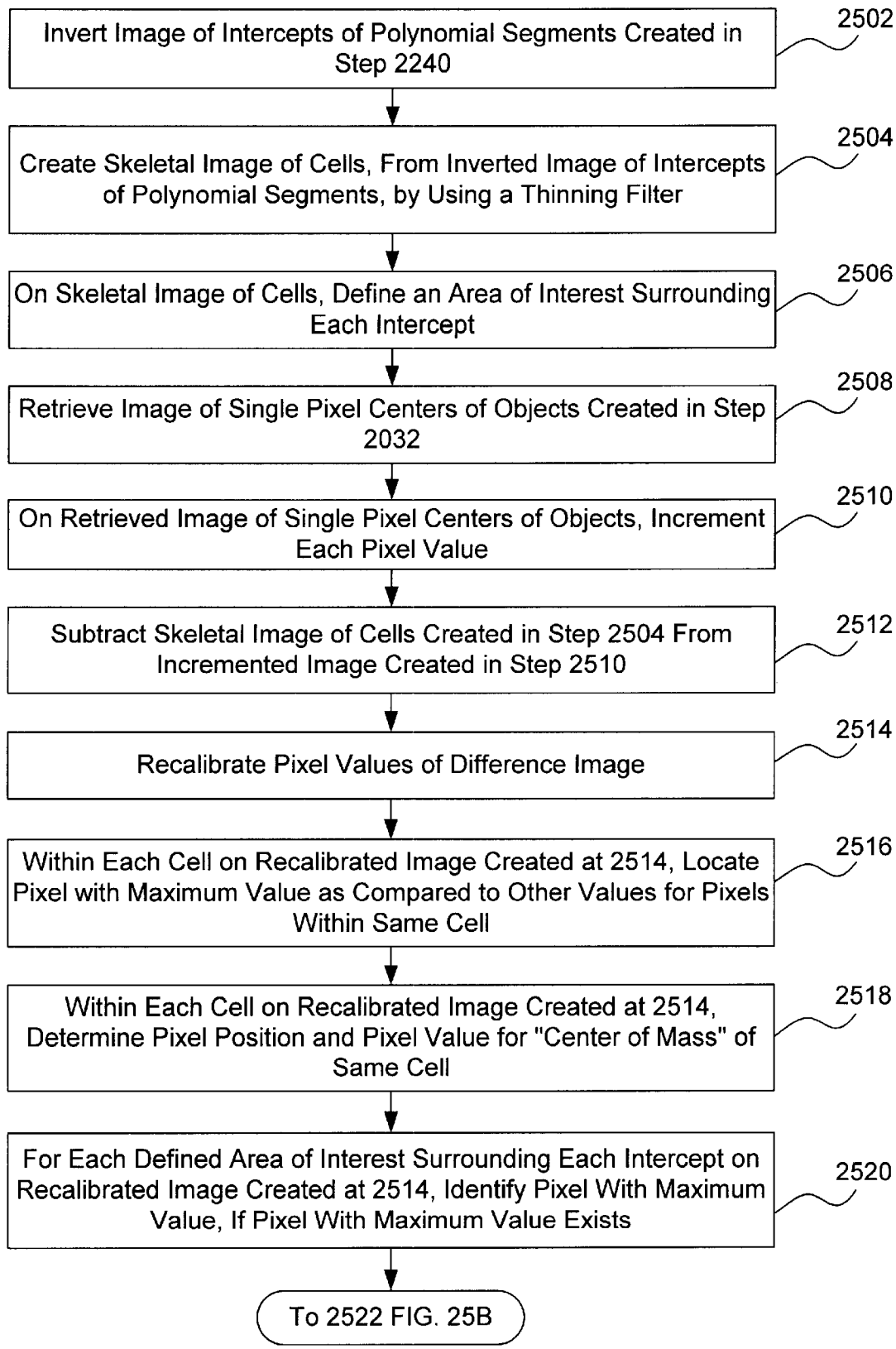
Figure 25B:
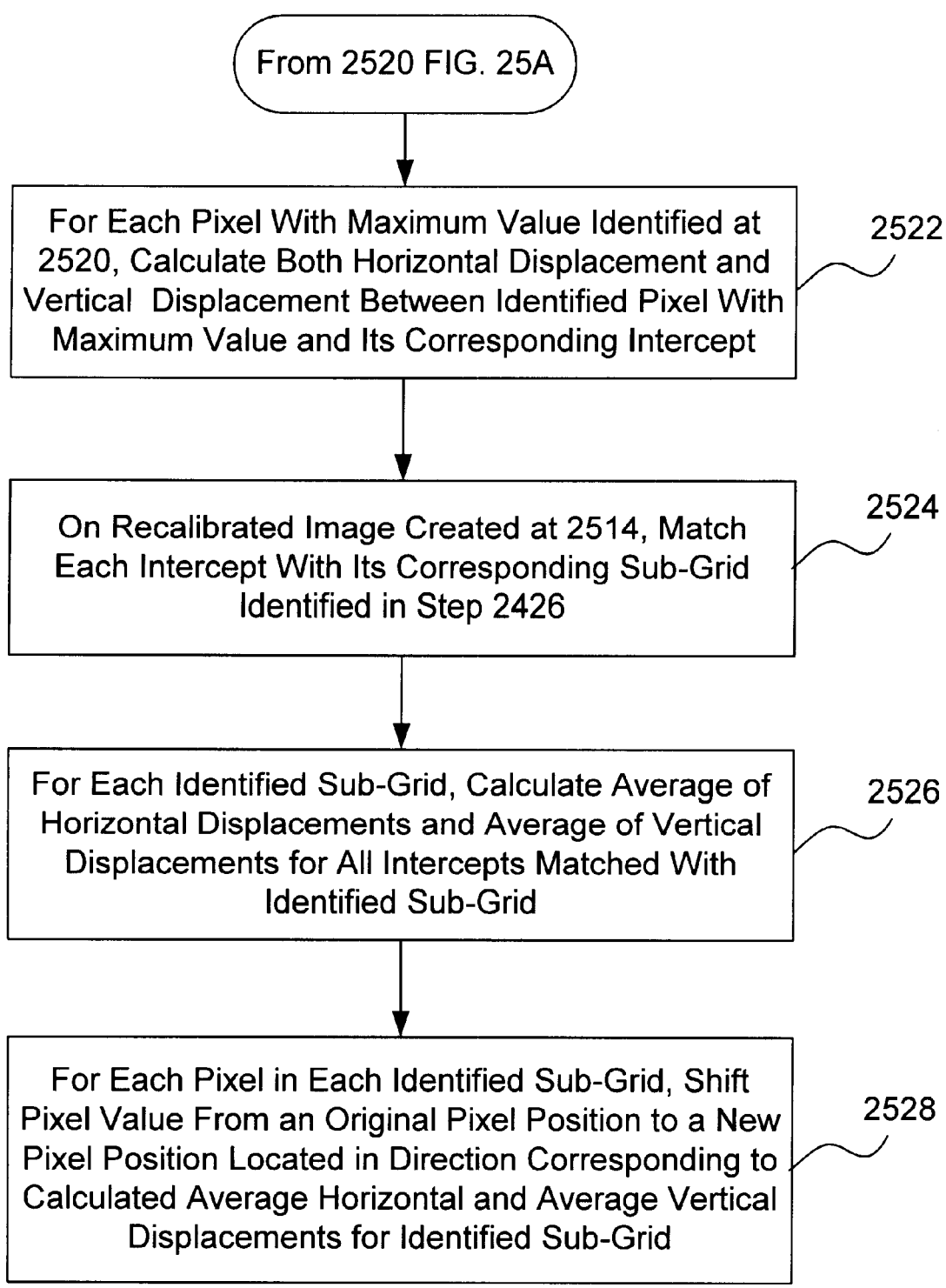
Figure 26:
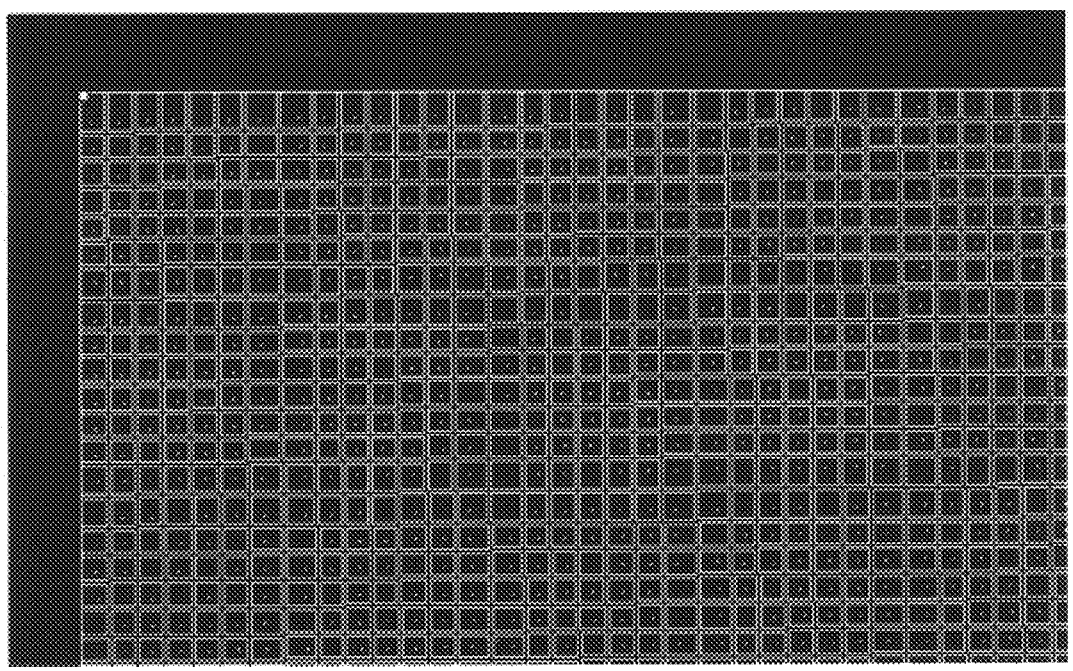
Figure 31:
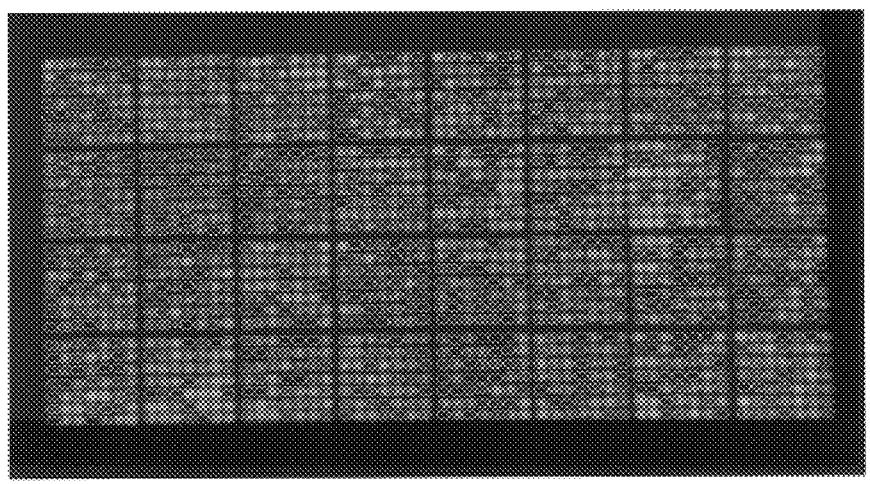
FIG. 31 shows an example of a final image of a grid overlay according to embodiments of the present invention.

The present invention will now be described by referencing operational flow diagrams shown in FIGS. 1, 4, 8, 11, 13, 14, 18, 20A, 20B, 22A, 22B, 24, 25A, 25B, 27, 28A, 28B, and 30. FIGS. 2, 3, 6, 7, 9, 10, 19, 21, and 29 depict images of the array at various stages of process. FIG. 15, 23, and 26 show intermediate images used to divine parameters, according to the present invention, for the grid overlay. FIGS. 5A, 5B, 12, 16, and 17 present graphical representations of the results of various mathematical analyses conducted in support of the present invention. FIG. 31 shows an example of a final image of a grid overlay in accordance with the present invention. FIG. 32 shows a block diagram of a system for a preferred embodiment of the present invention. The present invention will be described in connection with the analysis of a digital image of an array that would be produced in a typical biotechnological experiment.

Figure 2:
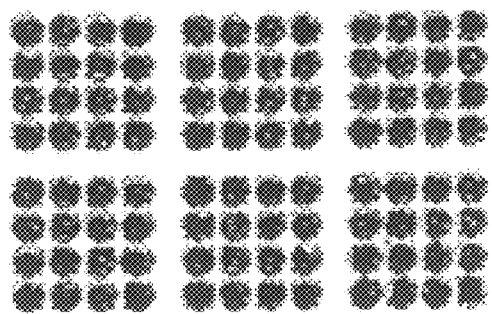
FIGS. 2, 3, 6, 7, 9, 10, 19, 21, and 29 depict images of the array at various stages of process according to embodiments of the present invention.
Figure 3:
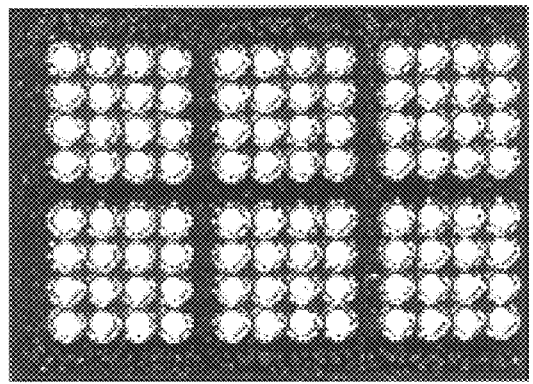
Figure 4:
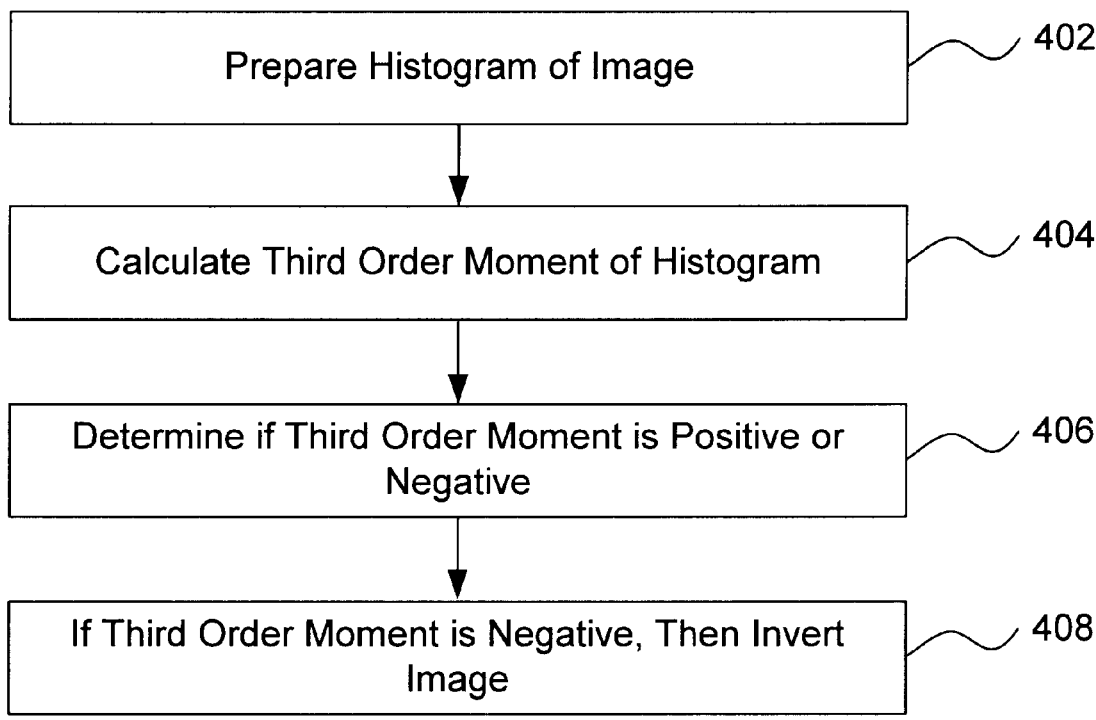
Figure 5A:
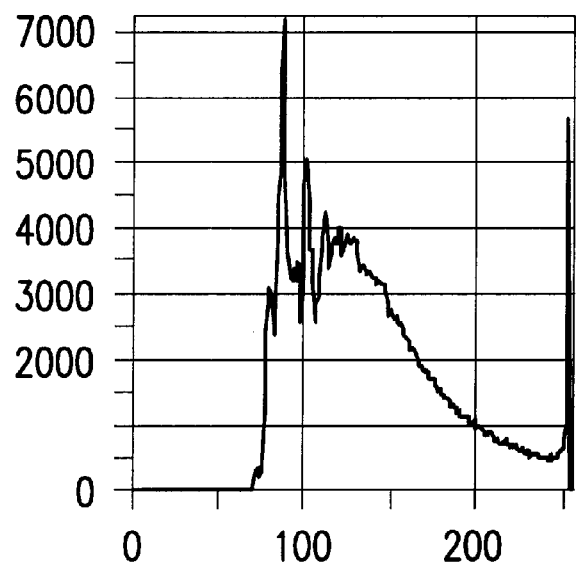
FIGS. 5A, 5B, 12, 16, and 17 present graphical representations of the results of various mathematical analyses conducted in support of the present invention.
Figure 5B:
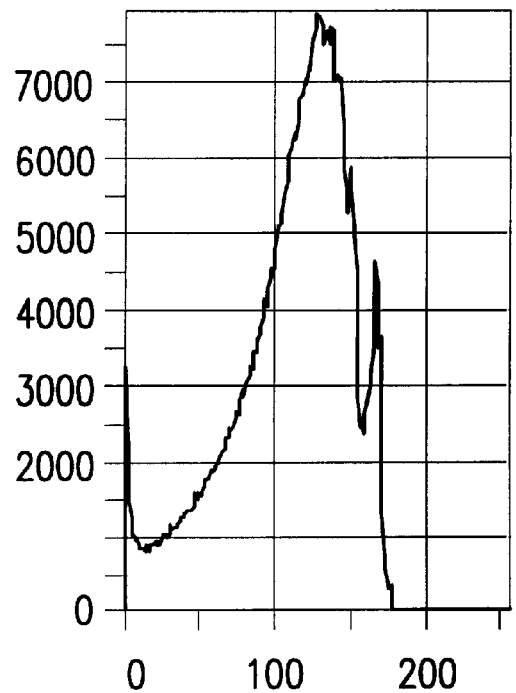

FIG. 1 shows a high level operational block diagram of a preferred embodiment of the present invention. Because the present invention is designed to function on images of arrays of various sizes and densities, preliminary procedures normalize the image so that optimal results may be obtained. Results may be improved if the present invention is used to process a positive image, but processing can be performed on a negative image as well. (FIG. 2 shows a representative negative image; FIG. 3 depicts a typical positive image.) In FIG. 1, at a step 102, it is determined whether the image is negative and, if it is, the image is converted to positive. FIG. 4 includes an operational block diagram for the process by which this determination is made, but one skilled in the art will recognize both that there are other ways in which processing of the image can account for the intensity of the background of the image relative to the intensity of objects on the image and that there are other ways in which one can determine whether the image is negative. At a step 402, a histogram of the image is prepared. FIG. 5A shows a histogram for a representative positive image; FIG. 5B presents a histogram for a typical negative image. In FIG. 4, at a step 404, a third order moment of the prepared histogram is calculated. At a step 406, it is determined whether the value of the calculated third order moment is positive or negative. If the third order moment is negative, then the image is inverted at a step 408. This process can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually.

Figure 6:
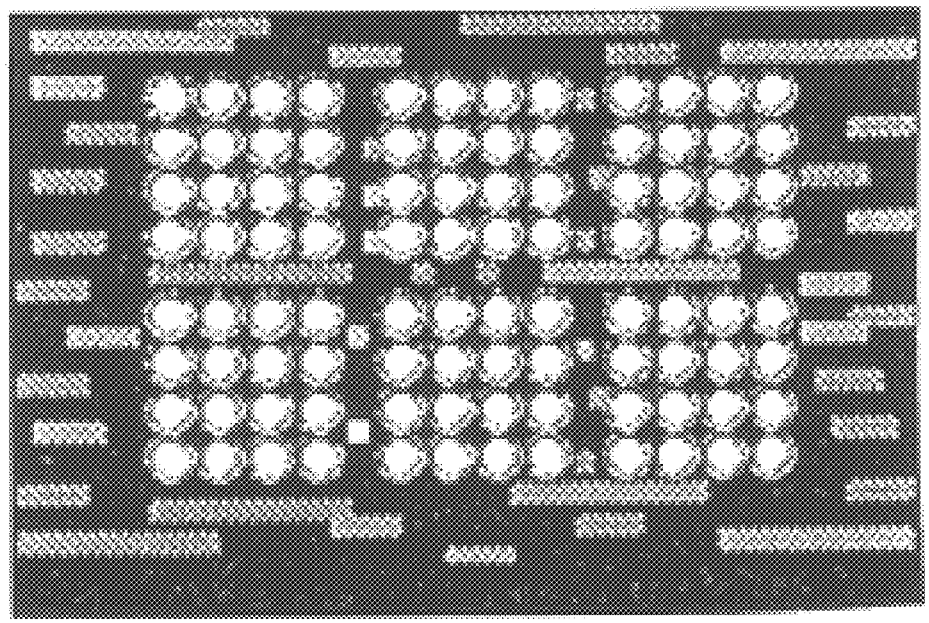
Figure 7:
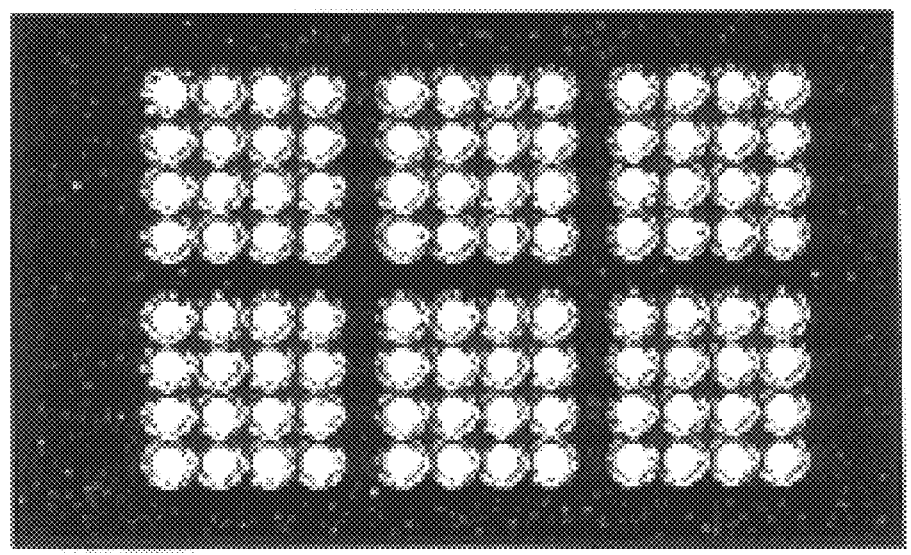
Figure 8:
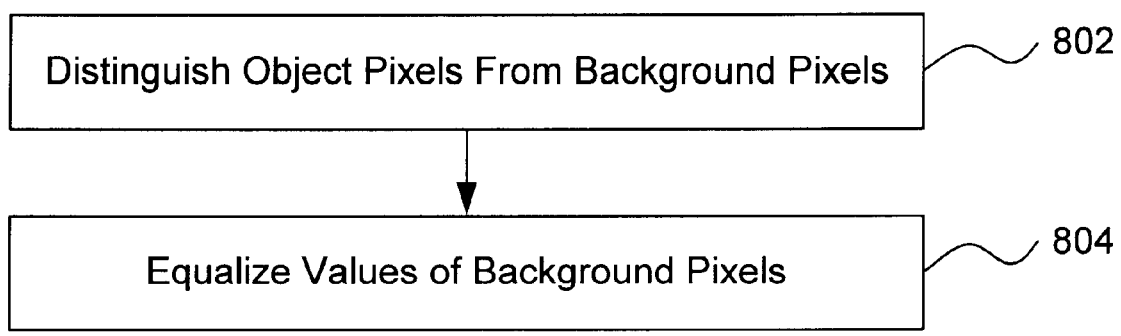

Turning again to FIG. 1, at a step 104, the image is corrected for fluctuations in intensity of energy emitted in the background. FIG. 6 shows an example of how uncorrected background might appear on an image. FIG. 7 depicts a corrected background. FIG. 8 includes an operational block diagram for the process by which the background is corrected, but one skilled in the art will recognize both that there are other ways in which processing of the image can account for background fluctuations and that there are other ways in which one can correct the background. At a step 802, object pixels are distinguished from background pixels. In the preferred embodiment, objects are deemed to have a maximum size of seventy pixels. This is different from prior art approaches in which objects are determined solely by the level of pixel intensity and defined in terms of "not being background". Because the present invention takes the alternative approach and distinguishes background as "not being objects", the present invention is particularly effective when used for high density arrays. Once background pixels have been identified, their values are equalized at a step 804. This process can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually.

Figure 9:
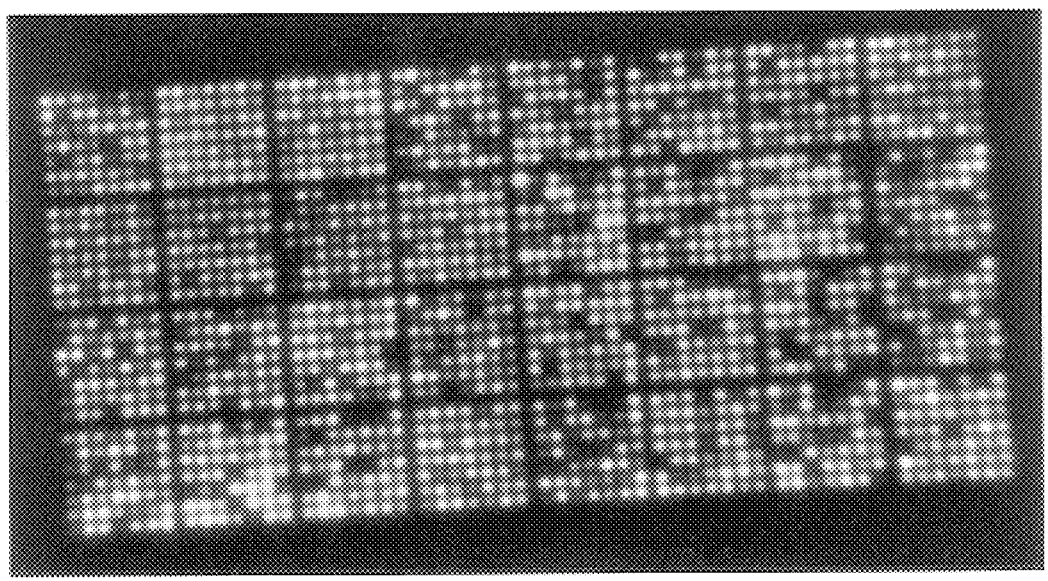
Figure 10:
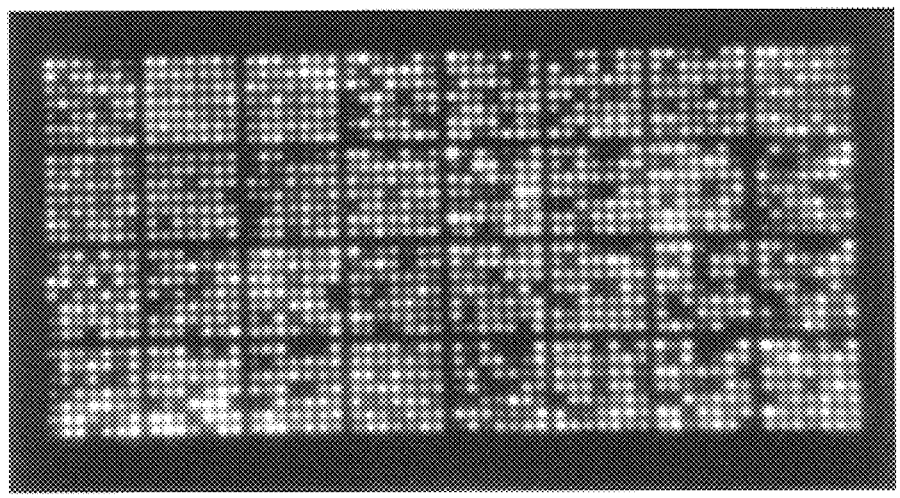

In FIG. 1, at a step 106, the array is aligned with the borders of the image. It is not unusual, when a detector system captures an image of an array, for the rows and columns of the array not to be substantially parallel to their nearest respective borders of the image. FIG. 9 shows such a case. Because the overall method outlined in FIG. 1 makes extensive use of image filtering processes wherein the filters are aligned with the rows and columns of image pixels, results are optimized when the rows and columns of the array are aligned, as closely as possible, with the rows and columns of image pixels. Sufficient results can be obtained with deviations of plus or minus two degrees. FIG. 10 shows an image wherein the array is aligned with the borders of the image.

Figure 12:
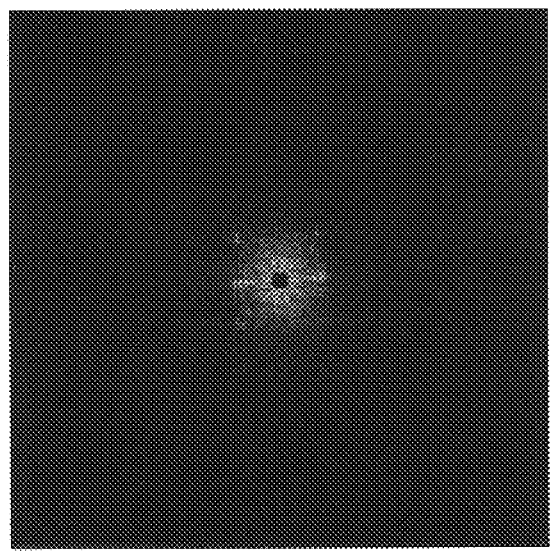
Figure 11:
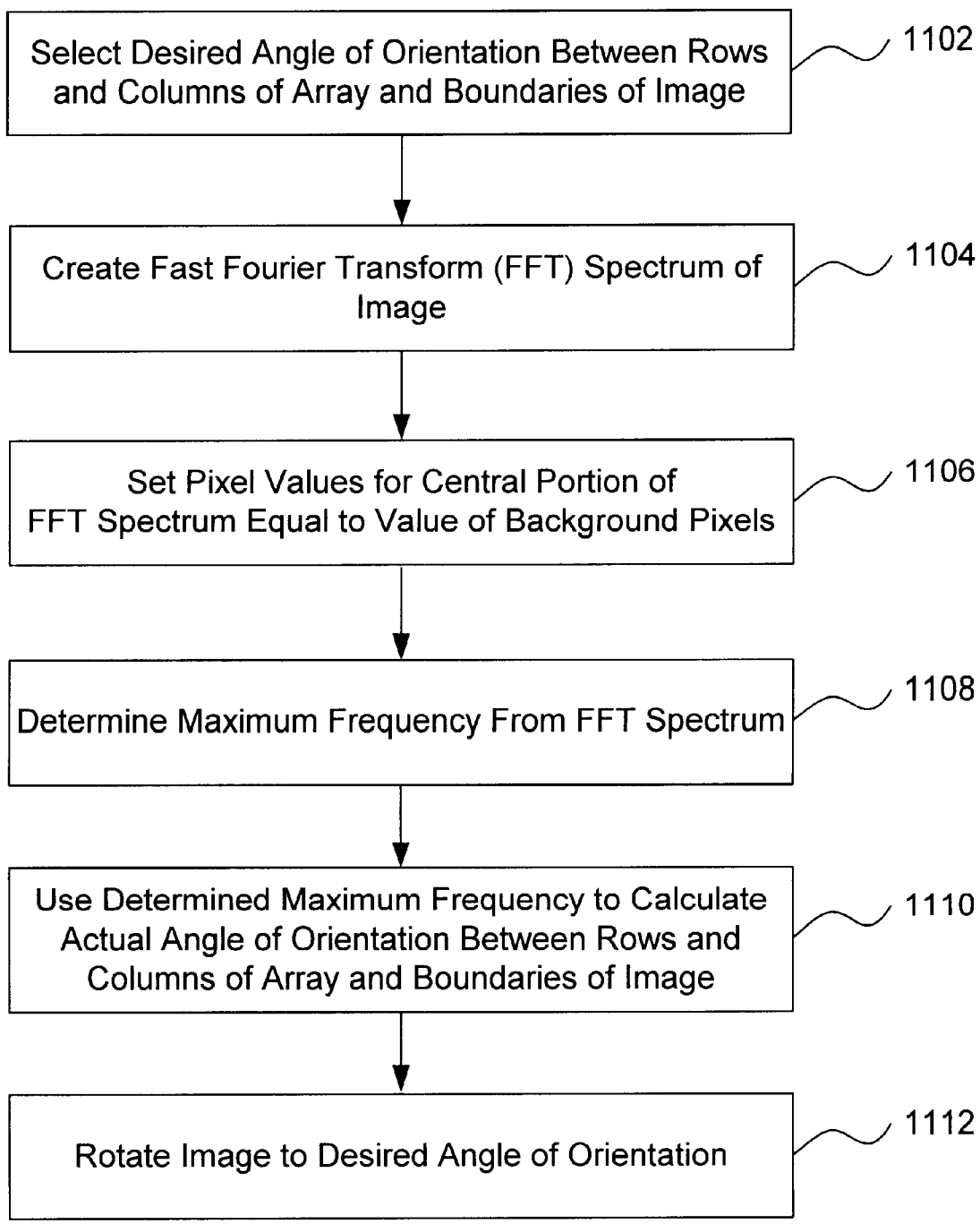

FIG. 11 includes an operational block diagram for the process by which the alignment of the array can be matched to the borders of the image, but one skilled in the art will recognize both that there are other ways in which processing of the image can account for an array that is not aligned with the borders of the image and that there are other ways in which one can correct the alignment of the image. At a step 1102, the user selects a desired angle of orientation between the rows and columns of the array and the respective boundaries of the image by entering a value in a dialog box included in the graphical user interface (not shown). In an alternative embodiment, the desired angle of orientation is preselected to a default value of zero. A fast fourier transform spectrum of a portion of the image is created at a step 1104. In the preferred embodiment, the portion of the image should measure 512 pixels in both dimensions. Where a dimension of the image is less than 512 pixels, all pixels in that dimension should be included in the portion used for the fast fourier transform spectrum. Where a dimension of the image exceeds 512 pixels, only the central portion of pixels in that dimension should be included in the portion used for the fast fourier transform spectrum. Other pixel sampling sites would be apparent to a person skilled in the relevant art. At a step 1106, pixel values for the central portion of the fast fourier transform spectrum are set equal to the value of the background pixels. In the preferred embodiment, this central portion of the fast fourier transform spectrum should have a radius of five pixels. This removes low frequency harmonics, those with periods of up to one hundred pixels, from the spectrum based on the assumption that the distance between array objects on the image is less than one hundred pixels. FIG. 12 depicts an image of a fast fourier transform spectrum with central pixels set equal to background pixels. In FIG. 11, at a step 1108, the maximum frequency from the fast fourier transform spectrum is determined. This corresponds to a periodical structure of the array along its longest dimension. With this information, at a step 1110, the actual angle of orientation between rows and columns of the array and boundaries of the image is determined Finally, at a step 1112, the image is rotated to its desired angle of orientation. This is different from prior art approaches in which alignment of the overlay grid is either performed manually or depends on orientation markers included on the substrate of the array and captured in the image. The present invention allows users to correct automatically the orientation of the array independent of any guides that may be included on the substrate. This process can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually.

Figure 13:
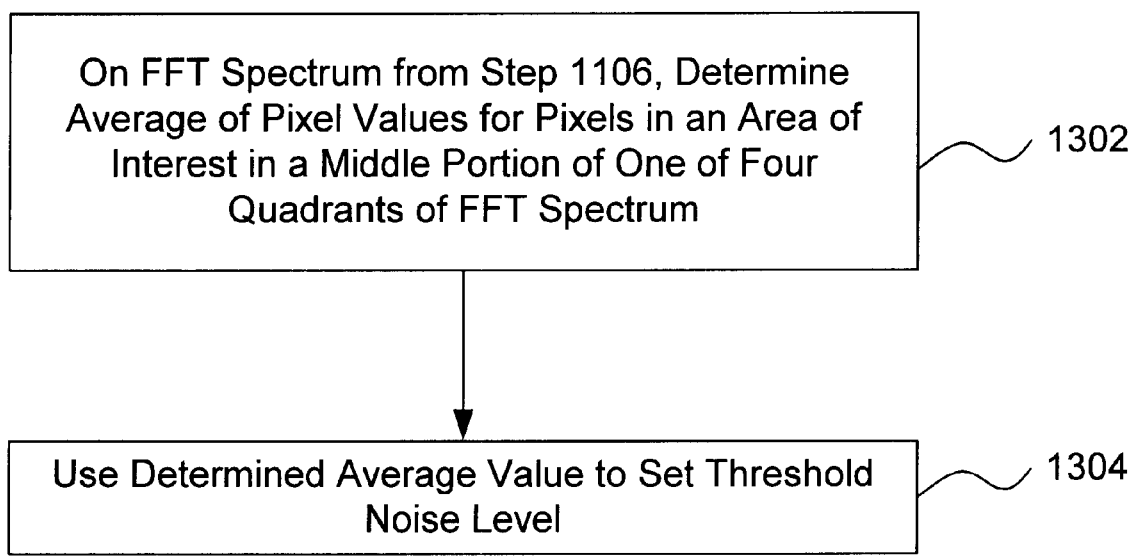

In FIG. 1, at a step 108, a measurement is made of the level of noise on the image. FIG. 13 includes an operational block diagram for the process by which the level of noise on the image is measured, but one skilled in the art will recognize that there are other ways in which processing of the image can account for various levels of noise and that there are other ways in which one can measure the level of noise on the image. At a step 1302, an average of pixel values for pixels in an area of interest in the middle of one of the four quadrants from the fast fourier transform spectrum created at a step 1106 is determined. At a step 1304, this determined average value is used to set a threshold noise level. In the preferred embodiment, the top right quadrant is used and an average intensity of is set equal to one hundred percent noise level. This calibration has been derived empirically through experimentation. An independent measurement of the noise level of each image facilitates the ability of the present invention to function with images of arrays of various sizes and densities and to adjust its efficacy to variations in noise intensity among different images. This process can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually.

Figure 16:
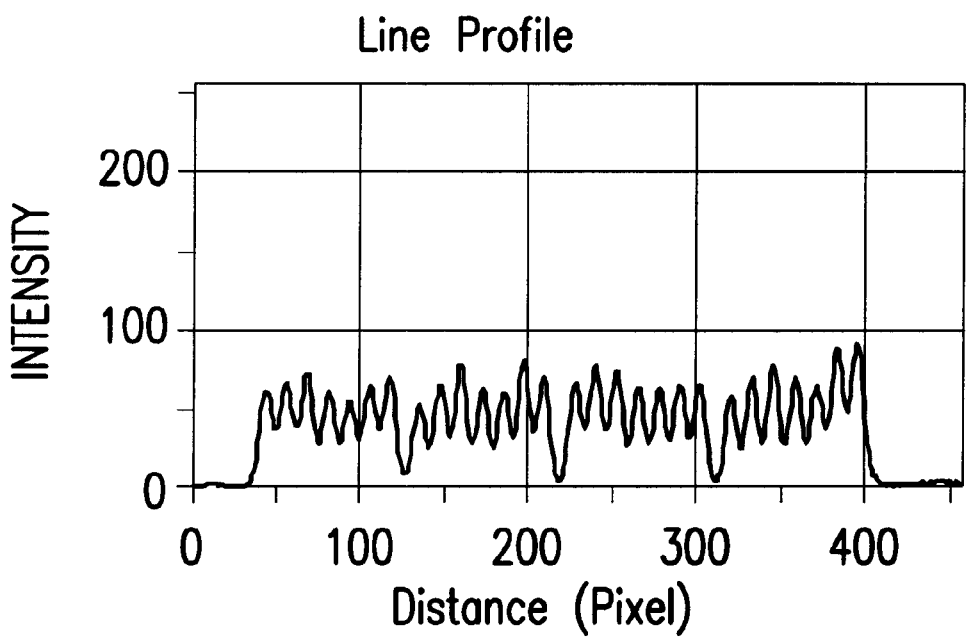
Figure 17:
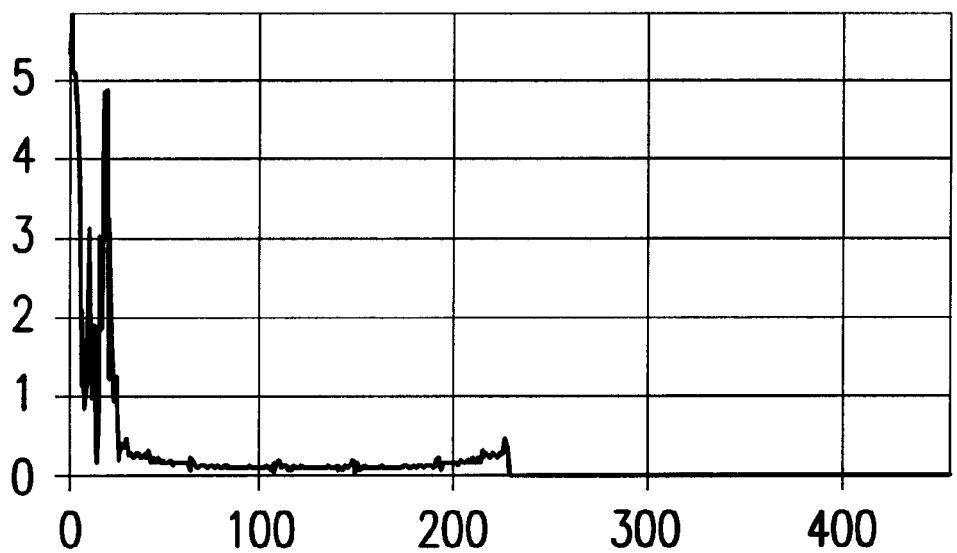

In FIG. 1, at a step 110, parameters for digital image processing filter sizes are calculated. FIG. 14 includes an operational block diagram for the process by which parameters for digital image processing filter sizes are calculated, but one skilled in the ail will recognize that there are other ways in which parameters for digital image processing filter sizes can be calculated. Because the present invention is designed to function on images of arrays of various sizes and densities, the process outlined in FIG. 14 measures distances between rows and columns of objects in the array to establish parameters for filter sizes for use in subsequent image processing. For optimal results, the process outlined in FIG. 14 should be applied to a positive image with a flat background and where the rows and columns of the array are aligned, as closely as possible, with the rows and columns of image pixels. In the preferred embodiment, this is the image created during a step 1112. At a step 1402, the user selects a lowpass filter size for use in one of the two dimensions by entering a value in a dialog box included in the graphical user interface (not shown). The selected lowpass filter size is a percentage of the total number of pixels in the image along the dimension to be filtered. In the other dimension, the size of the lowpass filter is one pixel. In an alternative embodiment, the lowpass filter size is preselected to a default value of fifty percent. At a step 1404, the image created during a step 1112 is lowpass filtered along the selected dimension. FIG. 15 depicts the results of this process. In FIG. 14, at a step 1406, the linear bands created on the lowpass filtered image are located. On this lowpass filtered image, at a step 1408, a line of pixels substantially perpendicular to the linear bands is formed, preferably in the middle of the image. A profile of this line of pixels is developed at a step 1410. FIG. 16 shows a graphical representation of a typical profile. In FIG. 14, at a step 1412, a fast fourier transform spectrum of the profile is prepared. In the preferred embodiment, the profile of the line of pixels is duplicated as necessary to increase the number of data points to 1024. This increases the accuracy of the fast fourier transform. FIG. 17 depicts a graphical representation of a fast fourier transform spectrum. In FIG. 14, at a step 1414, a maximum frequency is determined from the fast fourier transform spectrum. This maximum frequency is used, at a step 1416, to determine a filter size parameter for the selected dimension. The filter size parameter is characterized as the distance between objects in the direction perpendicular to the selected dimension. The value of this distance is displayed to the user in a dialog box included in the graphical user interface (not shown). The process is repeated for the other dimension at a step 1418. The process outlined in FIG. 14 can be performed manually or automatically based on a decision made by the user, via a dialog box included in the graphical user interface, before initiating the method. If the user decides to perform this process automatically, the user, before initiating the method, can also choose, via a dialog box included in the graphical user interface, to edit the results manually.

Figure 18:
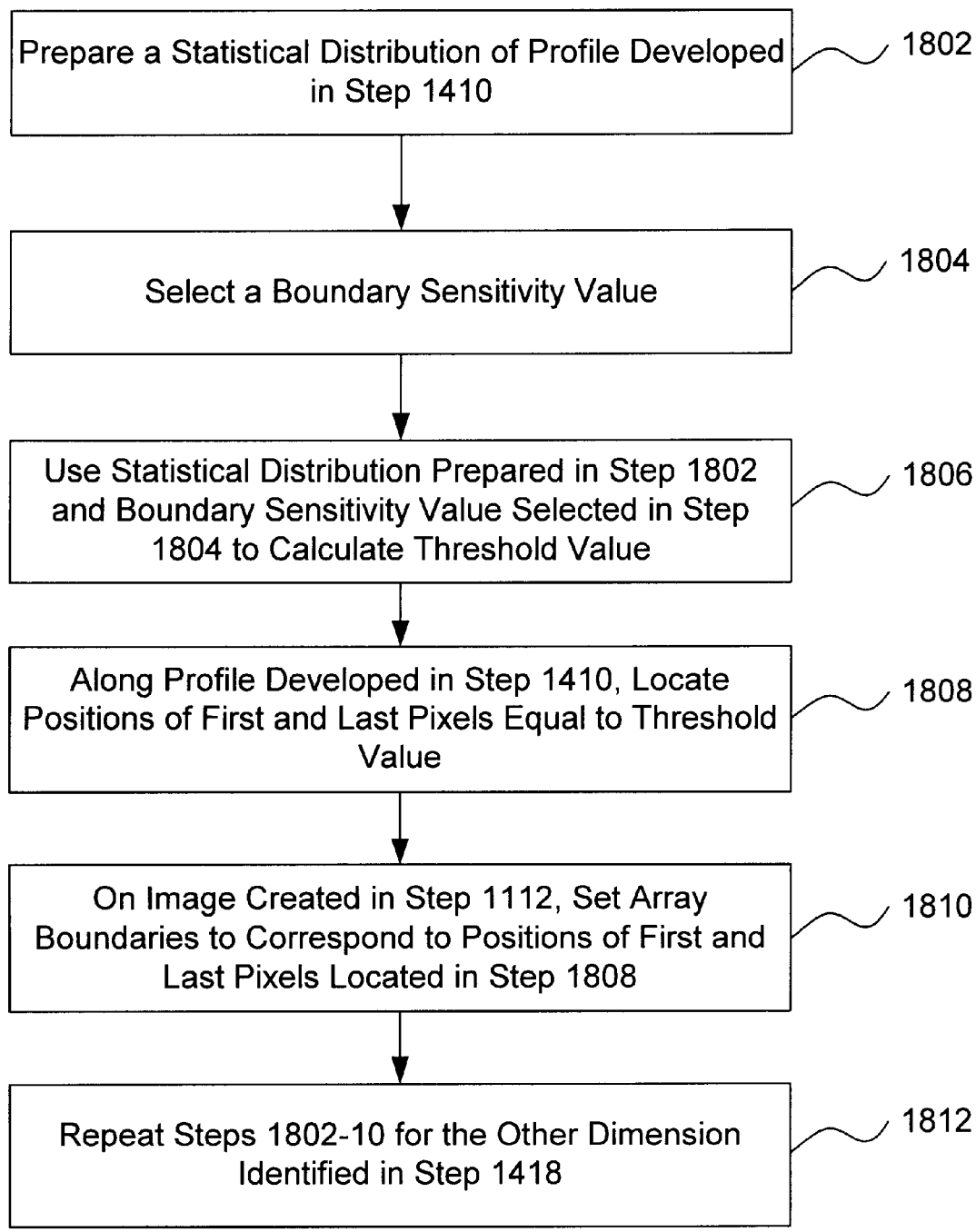
Figure 19:
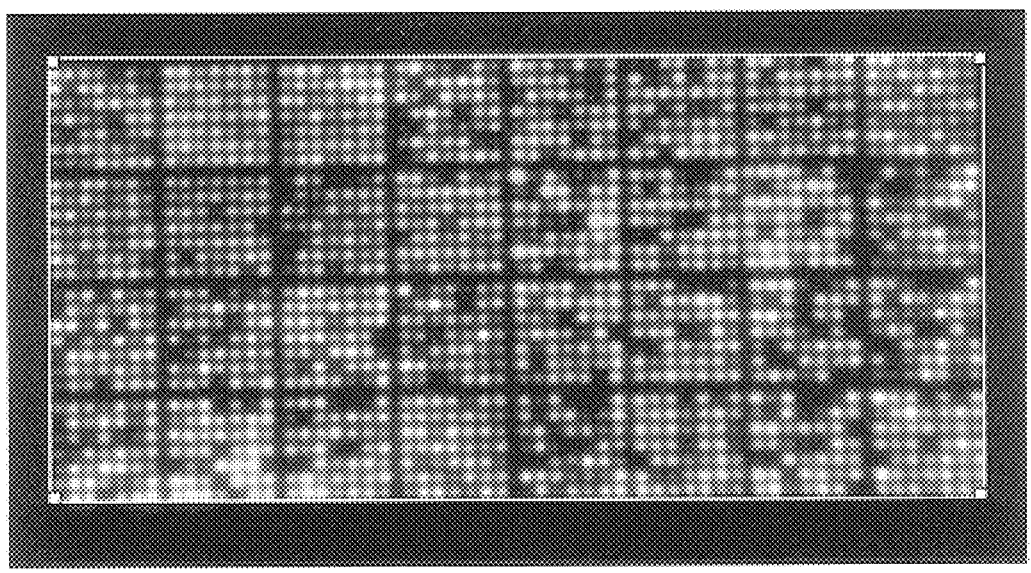

In FIG. 1, at a step 112, boundaries for the array are defined. FIG. 18 includes an operational block diagram for the process by which boundaries for the array are defined, but one skilled in the art will recognize both that there are other ways in which processing of the image can account for boundaries of the array and that there are other ways in which one can define boundaries for the array. Bounding the array at this stage in the overall scheme defines an area of interest for future processing. Limiting the area of interest ensures that objects on the image outside the array are not included in subsequent calculations. This optimizes the results of the process. In the preferred embodiment, the process outlined in FIG. 18 is conducted in conjunction with the process outlined in FIG. 14 so that determination of the two array boundaries for a given dimension is initiated when that dimension is selected for lowpass filtering at a step 1402. In FIG. 18, at a step 1802, a statistical distribution of the profile developed at a step 1410 is prepared. At a step 1804, the user selects a boundary sensitivity value by entering a value in a dialog box included in the graphical user interface (not shown). The selected boundary sensitivity value is a percentage of the range of the statistical distribution. In an alternative embodiment, the boundary sensitivity value is preselected to a default value. At a step 1806, a threshold value is calculated using the statistical distribution prepared at a step 1802 and the boundary sensitivity value selected at a step 1804. The threshold value is set equal to the additive sum of the minimum value from the statistical distribution and the multiplicative product of the boundary sensitivity value and the range of the statistical distribution. At a step 1808, the positions, along the profile developed at a step 1410, of the first and last pixels equal to the threshold value are located. At a step 1810, array boundaries are set, on the image created during a step 1112, to correspond to the positions of the first and last pixels located at a step 1808. The process is repeated for the other dimension at a step 1812. The process outlined in FIG. 18 can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually. FIG. 19 shows an image of an array with defined boundaries.

Figure 20A:
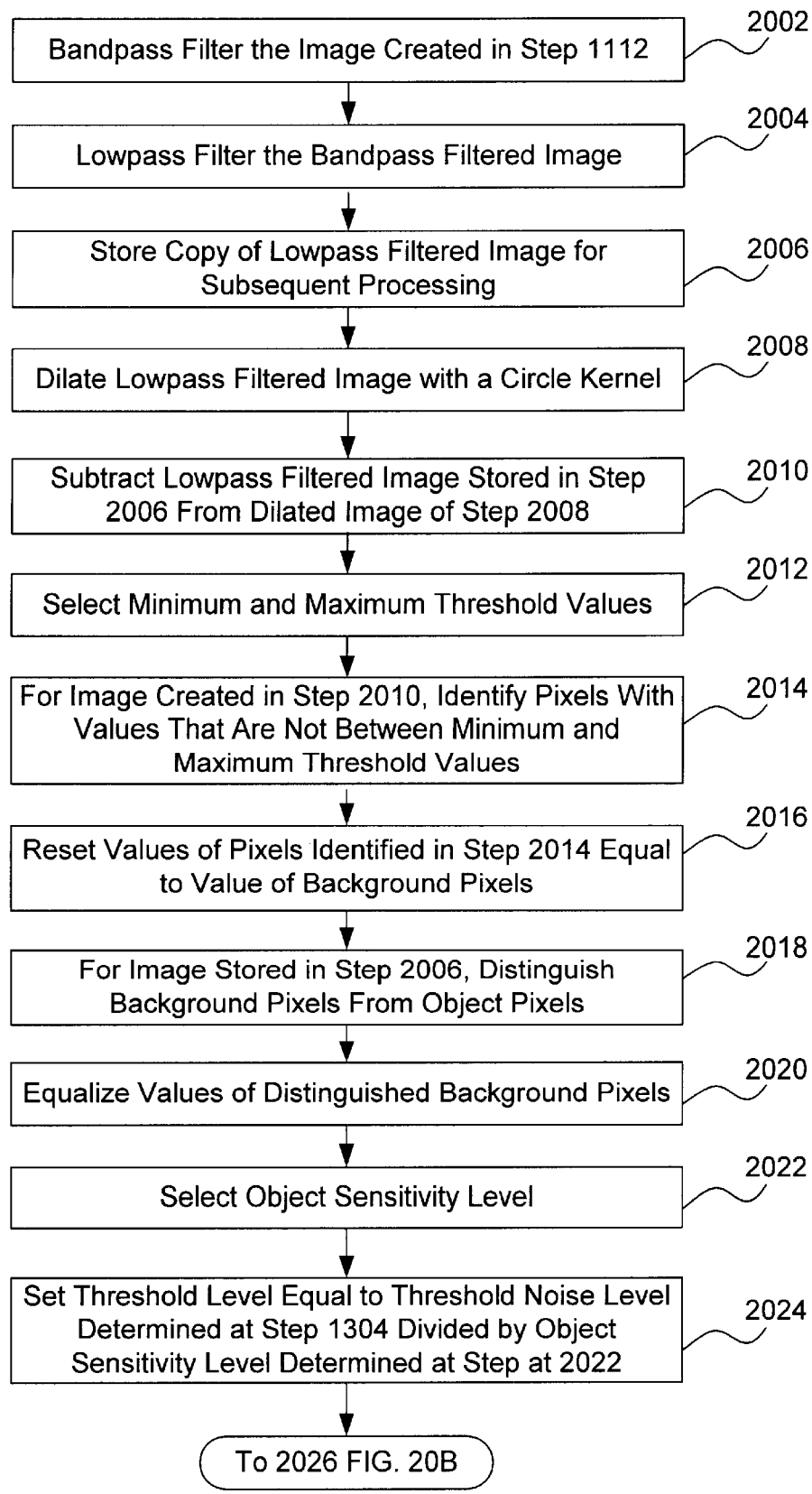
Figure 20B:
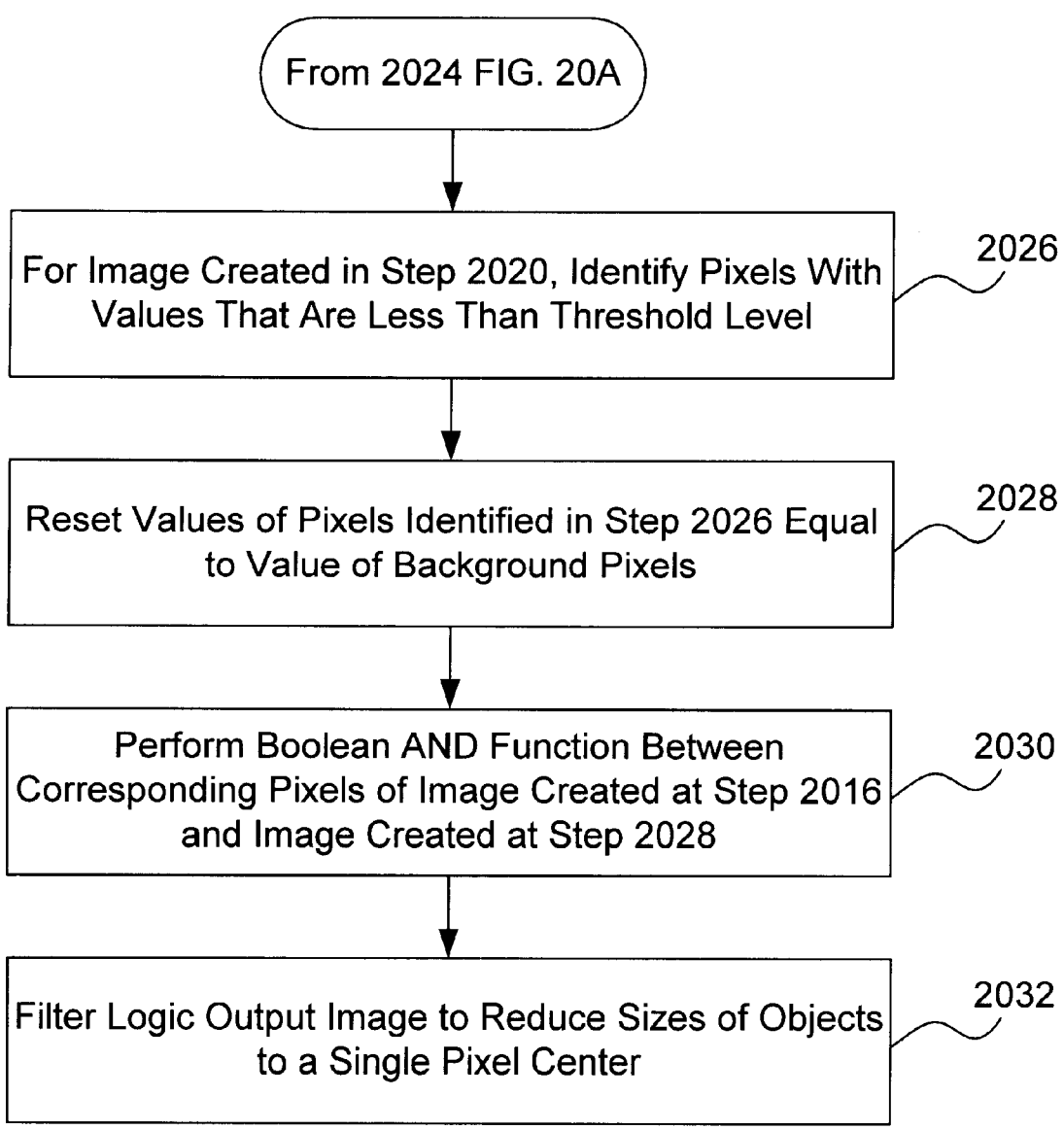

In FIG. 1, at a step 114, single pixel centers of the objects are located. FIGS. 20A and 20B include an operational block diagram for the process by which single pixel centers of the objects can be located, but one skilled in the art will recognize both that there are other ways in one can locate single pixel centers of the objects. For optimal results, the process outlined in FIGS. 20A and 20B should be applied to a positive image with a flat background and where the rows and columns of the array are aligned, as closely as possible, with the rows and columns of image pixels. In the preferred embodiment, this is the image created during a step 1112. In FIG. 20A, at a step 2002, the image created during a step 1112 is bandpass filtered. In the preferred embodiment, the upper cutoff frequency of the bandpass filter is set as a function of the maxima of the filter size parameters determined at a step 1416 for both dimensions. The lower cutoff frequency of the bandpass filter is set at one-fifth the value of the upper cutoff frequency. Bandpass filtering with a filter this size increases the contrast between objects and the background, for those objects on the image sized similar in magnitude to reaction sites on the array, and reduces the level of noise on the image. At a step 2004, the resultant bandpass filtered image is lowpass filtered. In the preferred embodiment, the cutoff frequency of the lowpass filter is set as a function of the minima of the filter size parameters determined at a step 1416 for both dimensions. Depending on the size of the objects, the image will require two to four iterations of lowpass filtering. Lowpass filtering with a filter this size smooths the image, removes noise, and transforms the shape of a three-dimensional profile of the intensity of an object from annular- to mound-shaped so that a point of maximum amplitude is situated at the "center of mass" for the object. At a step 2006, a copy of the resultant lowpass filtered image is stored for subsequent processing. The original lowpass filtered image is dilated, at a step 2008, with a circle kernel filter sized twenty percent larger than the distance between objects. This eliminates maxima that might be located between rows or columns of the array. At a step 2010, the copy of the lowpass filtered image, stored at a step 2006. is subtracted from the dilated image, created at a step 2008, creating a difference image. At a step 2012, minimum and maximum threshold values are set to preselected default values. In an alternative embodiment, the minimum and maximum threshold values can be manually selected. At a step 2014, pixels, on the difference image created at a step 2010, with values that are not between the minimum and maximum threshold values are identified. At a step 2016, the values of these identified pixels are reset to equal the value of background pixels. The resultant first threshold filtered image contains pixels representing the local maxima of objects on the original image that are positioned along the rows and columns of the array. However, some of these local maxima may be from noise. Therefore, local maxima with values below a sensitivity level will need to be removed.

In FIG. 20A, at a step 2020, background pixels, on the copy of the lowpass filtered image stored for subsequent processing at a step 2006, are distinguished from object pixels. In the preferred embodiment, objects are deemed to have a maximum size equal to double the distance between rows and columns as determined at a step 1416. At a step 2020, the values of these distinguished pixels are equalized, thereby creating a background-corrected image. At a step 2022, an object sensitivity level is set to a preselected default value. In an alternative embodiment, the object sensitivity level can be manually selected by entering a value in a dialog box included in the graphical user interface (not shown). At a step 2024, a threshold level is set equal to the quotient of the threshold level, determined at step 1304, divided by the object sensitivity level, determined at step 2022. By setting the threshold level in this manner, the present invention is able automatically to adjust its efficacy to variations in intensity among different images. In FIG. 20B, at a step 2026, pixels, on the background corrected image created at a step 2020, with values that are less than the threshold level are identified. At a step 2028, the values of these identified pixels are reset to equal the value of background pixels. The resultant second threshold filtered image contains pixels representing the local maxima of objects on the original image above a threshold level. What is needed is an image containing pixels representing the local maxima of objects on the original image that are both positioned along the rows and columns of the array and above a threshold level.

Figure 21:
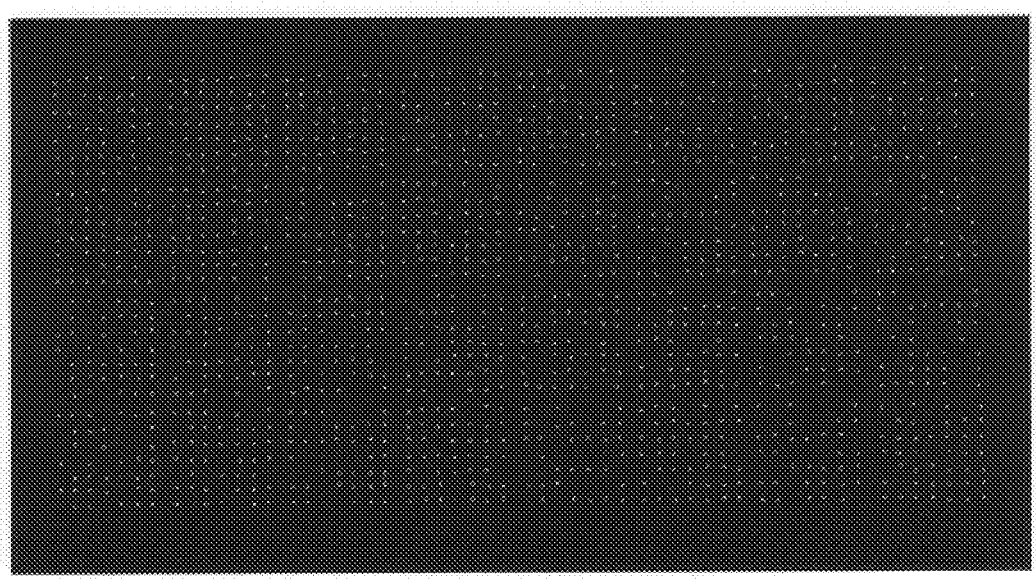

Thus, at a step 2030, a Boolean AND operation is performed between corresponding pixels of the first threshold filtered image created at a step 2016 and the second threshold filtered image created at a step 2028. The resultant logic output image contains pixels representing the local maxima of objects on the original image that are both positioned along the rows and columns of the array and above a threshold level. Some of the local maxima in the image created during a step 2030 are represented by more than one pixel. At a step 2032, the logic output image is filtered with a reduce or euclidean filter to reduce the size of all objects to a single pixel. The process outlined in FIGS. 20A and 20B can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually. FIG. 21 shows an image of single pixel centers of the objects.

Often a high density array is partitioned into sub-arrays to distinguish various aspects of an experiment, to separate different tests, or due to mechanical limitations in the means by which samples are applied to the substrate. Therefore, alignment of the grid overlay often must be segmented into sub-grids that correspond to the underlying sub-arrays. In FIG. 1, at a step 116, horizontal and vertical polynomial segments are created. These polynomial segments approximate lines that pass through the single pixel centers of the objects and are used to identify sub-grids within the array and align objects within these sub-grids. FIGS. 22A and 22B include an operational block diagram for the process by which horizontal and vertical polynomial segments are created, but one skilled in the art will recognize both that there are other ways in which processing of the image can account for sub-grids on the array and that there are other ways in which one can create horizontal and vertical polynomial segments. For optimal results, the process outlined in FIGS. 22A and 22B should be applied to an image of single pixel centers of the objects. In the preferred embodiment, this is the image created during a step 2032.

In FIG. 22A, at a step 2202, the single pixel centers of the objects are enlarged with a dilation filter to support subsequent filtering in one of two dimensions. In the preferred embodiment, the dilation filter is sized at one-third of the filter size parameter determined at a step 1416 for the dimension not selected (i.e., the other dimension). At a step 2204, the user selects a lowpass filter size, for use in the selected dimension, by entering a value in a dialog box included in the graphical user interface (not shown). The selected lowpass filter size is a percentage of the total number of pixels in the image along the dimension to be filtered. In the other dimension, the size of the lowpass filter is one-half of the filter size parameter determined at a step 1416 for the same other dimension. The selected size should be based on properties of the array. If objects along the selected dimension depart noticeably from a straight alignment, a smaller filter size should be used. However, the size selected should be large enough to maintain continuity along the dimension once it is filtered. Therefore, it is recommended that the selected size should not be smaller than thirty to forty percent of the size of the dimension being filtered. If, on the other hand, there are many gaps (i.e., missing objects) along the selected dimension, the filter size should be large enough to cover the gaps. The maximum size available for the filter is two hundred percent of the size of the dimension being filtered. In an alternative embodiment, the lowpass filter size is preselected to a default value. At a step 2206, the dilated image created at a step 2202 is lowpass filtered along the selected dimension. The resultant lowpass filtered image contains linear bands not unlike those that appear in the image created during a step 1404 (and depicted in FIG. 15), but thinner. At a step 2208, a copy of the resultant lowpass filtered image is stored for subsequent processing.

In FIG. 22A, at a step 2210, the original lowpass filtered image is dilated in the other dimension with a dilation filter sized twenty percent larger than the filter size parameter determined at a step 1416 for the same other dimension. This makes the linear bands appear thicker. At a step 2212, the copy of the lowpass filtered image, stored at a step 2208, is subtracted from the dilated image, created at a step 2210, creating a difference image. This difference image appears as a mask. Relatively dark linear bands are bounded by relatively light edges. At a step 2214, minimum and maximum threshold values are set to preselected default values. In an alternative embodiment, the minimum and maximum threshold values can be manually selected. At a step 2216, pixels, on the original difference image created at a step 2212, with values that are not between the minimum and maximum threshold values are identified. At a step 2218, the values of these identified pixels are reset to equal the value of background pixels, there by creating a first threshold filtered image. This first threshold filtered image appears as a cleaner version of the mask image. At a step 2220, a Boolean AND operation is performed between corresponding pixels of the lowpass filtered image stored at a step 2208 and the first threshold filtered image created at a step 2218, thereby creating a logic output image. This logic output image appears as a several lines that pass through the single pixel centers of the objects. At a step 2222, a line sensitivity level is set to a preselected default value. In an alternative embodiment, the line sensitivity level can be manually selected by entering a value in a dialog box included in the graphical user interface (not shown). At a step 2224, pixels, on the logic output image created at a step 2220, with values that are less than the line sensitivity level are identified. In FIG. 22B, at a step 2226, the values of these identified pixels are reset to equal the value of background pixels. This creates an image that appears as a cleaner version of the image of several lines that pass through the single pixel centers of the objects.

In FIG. 22B, at a step 2228, outlines, only of the lines on the image created during a step 2226 that entirely traverse the array, are extracted. This is done by using a count operation with a brightness and filter range for the bounding area selected automatically or manually. The different extracted outlines may include different numbers of outline points. Furthermore, the included outline points may not be equally distributed along the outlines. At a step 2230, a function is performed to create a set of coordinate points for each extracted outline so that each set of coordinate points is equally distributed along its corresponding extracted outline. At a step 2232, a polynomial function is derived for each set of coordinate points. At a step 2234, coefficient values for each derived polynomial function are stored for subsequent processing. The process is repeated for the other dimension at a step 2236. At a step 2238, an image of polynomial segments that approximate lines that pass through single pixel centers of the objects, for both dimensions, is created by using the coefficient values stored at a step 2234. Finally, at a step 2240, an image of the intercepts of the polynomial segments is created. The process outlined in FIGS. 22A and 22B can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually. FIG. 23 shows an image of polynomial segments that approximate lines that pass through the single pixel centers of the objects.

Figure 24:
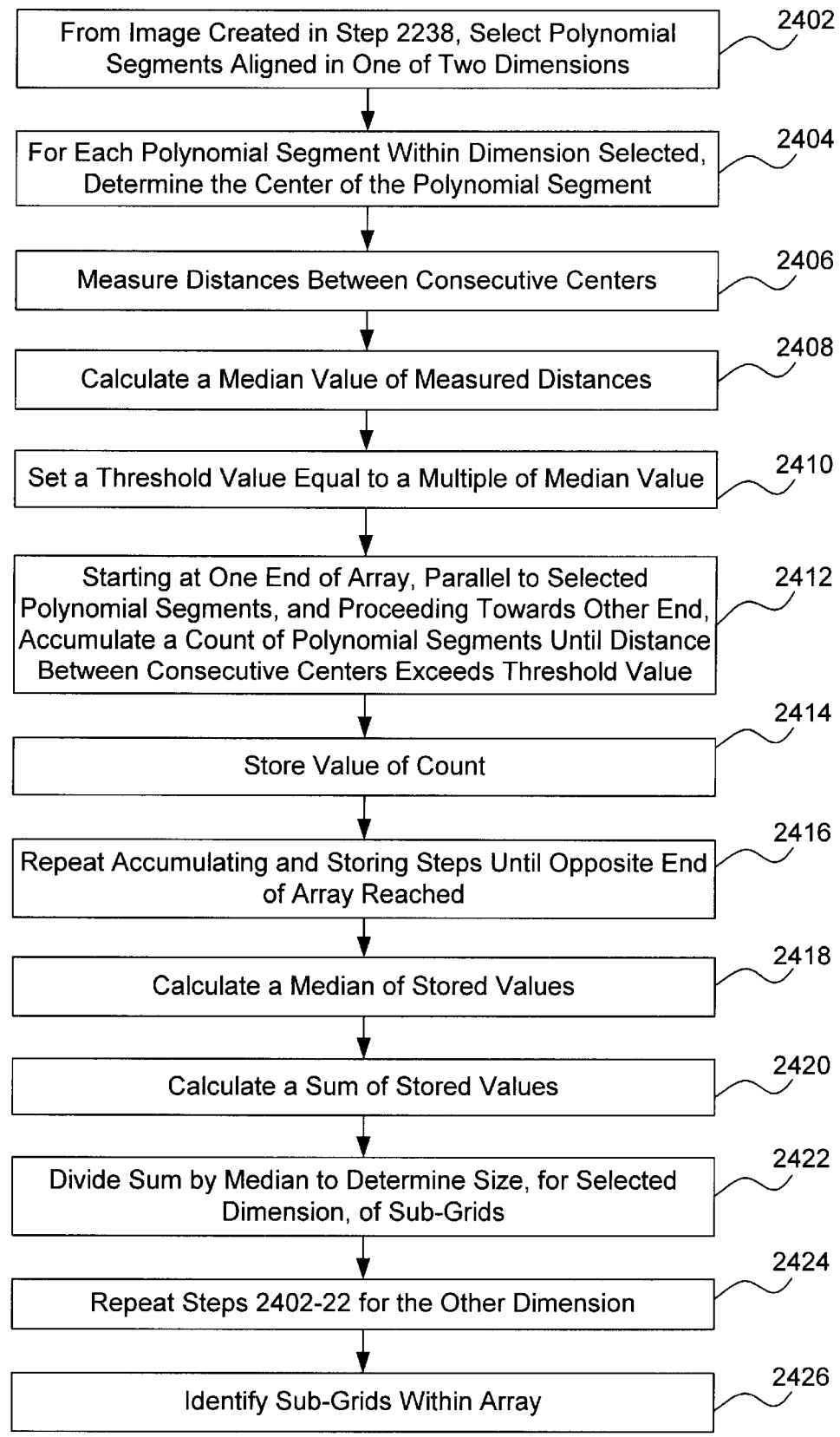

In FIG. 1, at a step 118, sub-grids within the array are identified. FIG. 24 includes an operational block diagram for the process by which sub-grids within the array are identified, but one skilled in the art will recognize both that there are other ways in which processing of the image can account for sub-grids on the array and that there are other ways in which one can identify sub-grids within the array. For optimal results, the process outlined in FIG. 24 should be applied to an image of polynomial segments that approximate lines, in both dimensions, that pass through single pixel centers of the objects. In the preferred embodiment, this is the image created during a step 2238. In FIG. 24, at a step 2402, polynomial segments in one of the two dimensions are selected. At a step 2404, a center of the polynomial segment is determined for each polynomial segment within the dimension selected. At a step 2406, the distances between consecutive centers are measured. A median value of the measured distances is calculated at a step 2408. At a step 2410, a threshold value is set equal to a multiple of the median value. In the preferred embodiment, the threshold value is set equal to the product of 1.2 times the median value. At a step 2412, a count of polynomial segments is accumulated. The count starts at one end of the array, parallel to the selected polynomial segments, and proceeds towards the other end. The count is accumulated until the distance between consecutive centers exceeds the threshold value. At a step 2414, the value of the count is stored. At a step 2416, the accumulating and storing steps are repeated until the end of the array is reached. That is to say, the process picks up counting polynomial segments where it left off and stores the value of the count each time the distance between consecutive centers exceeds the threshold value. At a step 2418, a median of the stored values is calculated; at a step 2420, a sum of the stored values is calculated. At a step 2422, the sum is divided by the median to determine the size of the sub-grids in the selected dimension. The process is repeated for the other dimension at a step 2424. Sub-grids with the array are identified at a step 2426. In an alternative embodiment, the count starts at one end of the array, parallel to the selected polynomial segments, and proceeds towards the other end, as in the previously described embodiment, however, a count event occurs only when the distance between consecutive centers exceeds the threshold value. The process is repeated for the other dimension. In this manner, the sub-grids are identified based on a known size of the grid divided by the value of the count. One skilled in the art will recognize that there are other mathematical means by which one can identify sub-grids. The process outlined in FIG. 24 can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually. When the process is performed manually or when the user edits the results of an automatically performed process, values for both dimensions of the sub-grids can be entered by the user via dialog boxes included in the graphical user interface.

In FIG. 1. at a step 120, centers are aligned on their sub-grids. FIGS. 25A and 25B include an operational block diagram for the process by which centers are aligned on their sub-grids, but one skilled in the art will recognize both that there are other ways in which processing of the image can account for the alignment of centers with respect to sub-grids on the array and that there are other ways in which one can align centers on their sub-grids. For optimal results, the process outlined in FIGS. 25A and 25B includes both an image of intercepts of polynomial segments that approximate lines, in both dimensions, that pass through single pixel centers of the objects and an image of single pixel centers of the objects. In the preferred embodiment, these are the images created, respectively, at a step 2240 and 2032. In FIG. 25A, at a step 2502, the image of intercepts of polynomial segments, created at a step 2240, is inverted. At a step 2504, a thinning filter is used on the inverted image of intercepts of polynomial segments, to create a skeletal image of cells. The thinning filter creates the skeletal image of cells by copying the value stored in the pixel at each intercept into pixels extending in all four directions from this intercept pixel until similar extensions from neighboring intercept pixels are encountered. The cells are defined as the areas enclosed by the skeletal boundaries. At a step 2506, an area of interest surrounding each intercept is defined along the lines of the skeletal boundaries.

In FIG. 25A, at a step 2508, the image of single pixel centers of the objects, created at a step 2032, is retrieved. At a step 2510, the value of each pixel, on the retrieved image of single pixel centers of objects, is incremented, thereby creating an incremented image. In the preferred embodiment, each pixel is incremented by a value of one to ensure that no pixel has a value of zero. At a step 2512, the skeletal image of cells, created at a step 2504, is subtracted from the incremented image, created at a step 2510, thereby creating a difference image. At a step 2514, pixel values on the difference image are recalibrated. In the preferred embodiment, pixels with values of zero or one are set equal to zero and all other pixels are linearly calibrated to a maximum value of 255. At a step 2516, a pixel of maximum value is located for each cell on the recalibrated image. The pixel of maximum value is based on a comparison of pixel values for all pixels within the same cell. At a step 2518, a "center of mass" is determined for each cell on the recalibrated image. The "center of mass" is represented as a pixel value and a pixel position. At a step 2520, a pixel of maximum value is identified, if it exists, for each defined area of interest surrounding each intercept on the recalibrated image. In the preferred embodiment, a maximum value greater than zero indicates that a single pixel center is within the area of interest. In FIG. 25B, at a step 2522, both the horizontal displacement and the vertical displacement between a pixel of maximum value, identified at a step 2520, and its corresponding intercept are calculated. This is done for each pixel of maximum value identified at a step 2520.

In FIG. 25B, at a step 2524. each intercept, on the recalibrated image, is matched with its corresponding sub-grid, identified at a step 2426. At a step 2526, for each identified sub-grid, an average of the horizontal displacements and an average of the vertical displacements are calculated for all intercepts matched with the identified sub-grid. Finally, at a step 2528, for each pixel in each identified sub-grid, the pixel value is shifted from an original pixel position to a new pixel position located in the direction corresponding to the calculated average horizontal and the average vertical displacements for the identified sub-grid., thereby creating an image of centers aligned on their sub-grids. The process outlined in FIGS. 25A and 25B can be performed manually or automatically based on a decision made by the user, via a dialog box included in the graphical user interface (not shown), before initiating the method, If the user decides to perform this process automatically, the user, before initiating the method, can also choose, via a dialog box included in the graphical user interface, to edit the results manually. FIG. 26 shows an image of centers aligned on their sub-grids.

Figure 27:
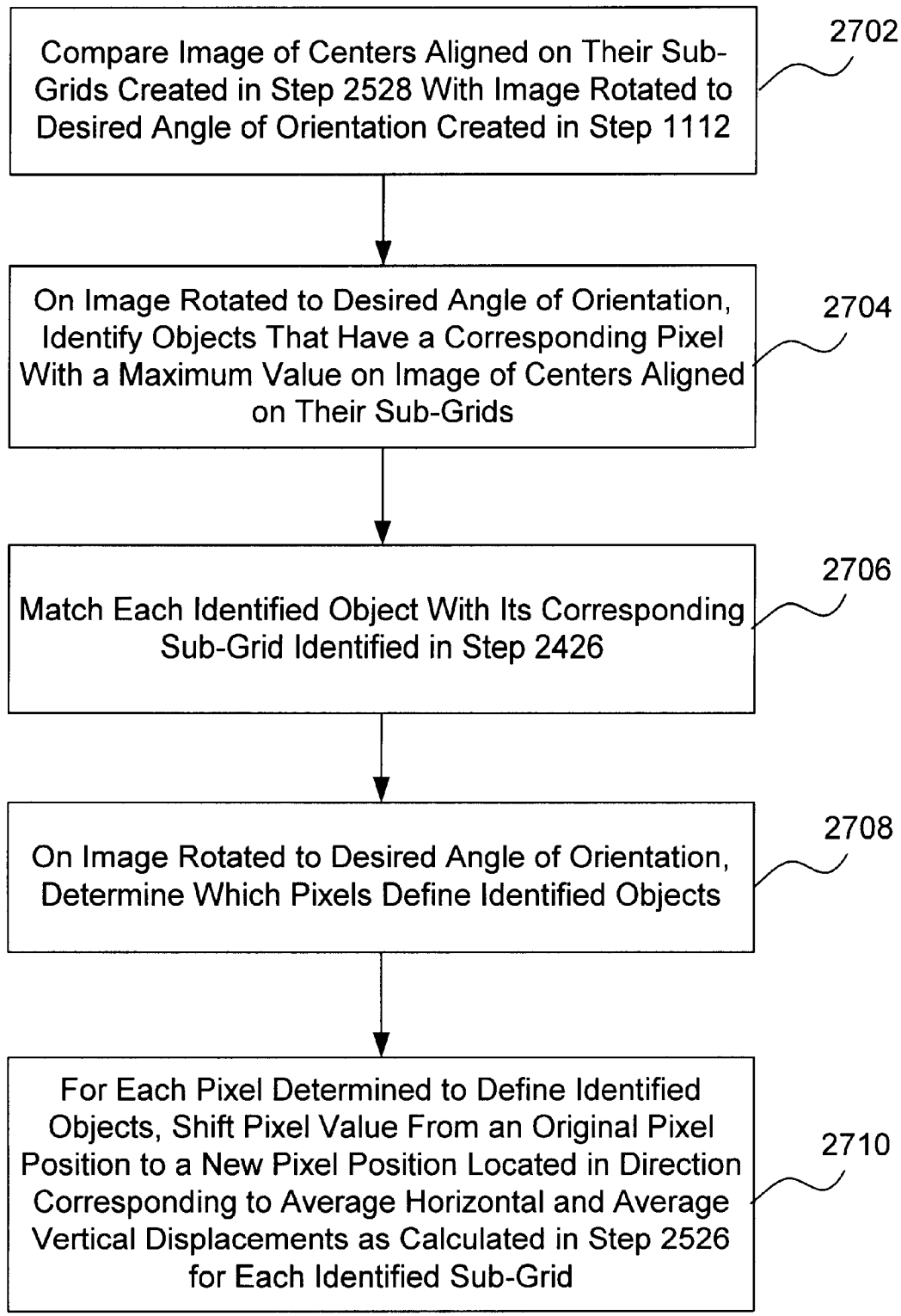

In FIG. 1, at a step 122, objects are repositioned within their corresponding aligned sub-grids. FIG. 27 includes an operational block diagram for the process by which objects are repositioned within their corresponding aligned sub-grids, but one skilled in the art will recognize both that there are other ways in which processing of the image can account for the repositioning of objects within their corresponding aligned sub-grids and that there are other ways in which one can reposition objects within their corresponding aligned sub-grids. In the preferred embodiment, the process outlined in FIG. 27 is conducted in conjunction with the process outlined in FIG. 25 so that the repositioning of objects within their corresponding aligned sub-grids is initiated after centers are aligned on their sub-grids at a step 2528. For optimal results, the process outlined in FIG. 27 compares an image rotated to a desired angle of orientation with an image of centers aligned on their sub-grids and rotated to a desired angle of orientation. In the preferred embodiment, these are the images created, respectively, at a step 1112 and 2528. In FIG. 27, at a step 2702, the image of centers aligned on their sub-grids and rotated to a desired angle of orientation, created at a step 2528, is compared with the image rotated to a desired angle of orientation, created at a step 1112. At a step 2704, objects, on the image rotated to a desired angle of orientation, that have a corresponding pixel with a maximum value, on the image of centers aligned on their sub-grids and rotated to a desired angle of orientation, are identified. Not all objects will have a corresponding pixel of maximum value. At a step 2706, each object, identified to have a corresponding pixel of maximum value, is matched with its corresponding sub-grid, identified at a step 2426. At a step 2708, pixels, on the image rotated to a desired angle of orientation, that define objects identified as having corresponding pixels of maximum value, are determined. Finally, at a step 2710, for each pixel determined to define an identified object, the pixel value is shifted from an original pixel position to a new pixel position located in the direction corresponding to the average horizontal and the average vertical displacements as calculated at a step 2526 for each identified sub-grid, thereby creating an image of repositioned objects within their corresponding aligned sub-grids and rotated to a desired angle of orientation The process outlined in FIG. 27 can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually.

Figure 28A:
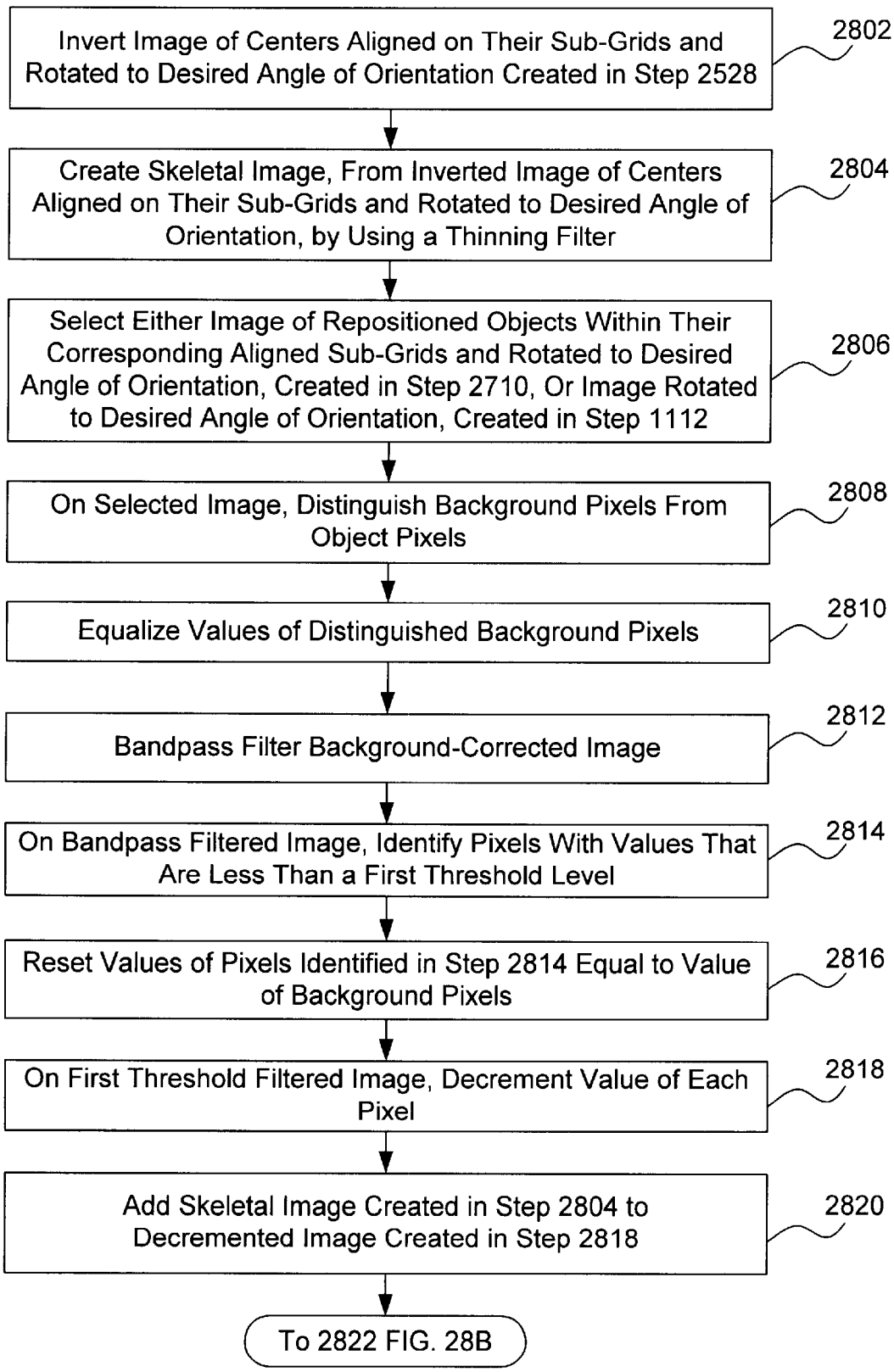
Figure 28B:
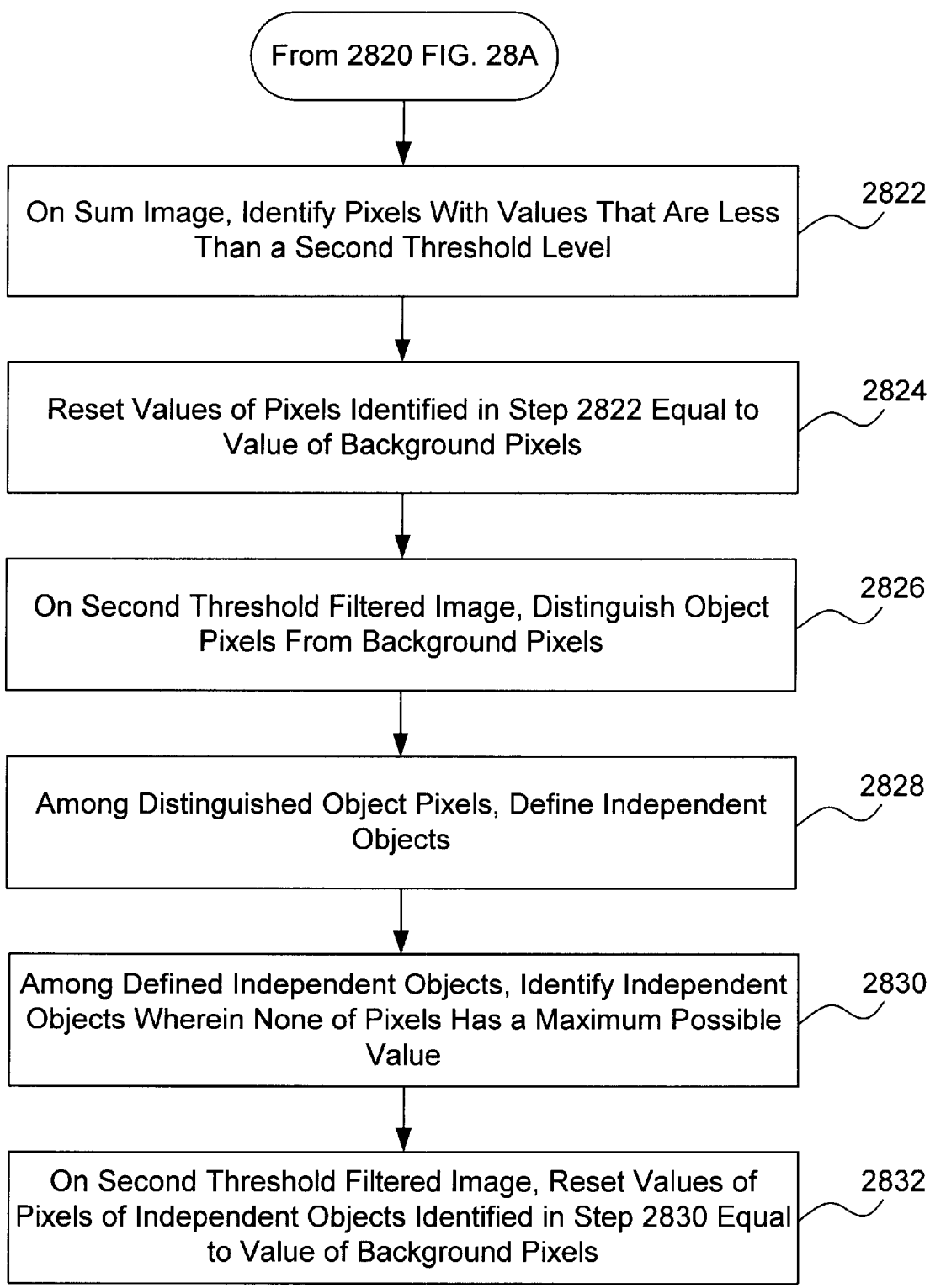

In FIG. 1, at a step 124, noise is removed from the image. FIG. 28 includes an operational block diagram for the process by which noise is removed from the image, but one skilled in the art will recognize both that there are other ways in which processing of the image can account for noise and that there are other ways in which one can remove noise from the image. Until this point, the preferred embodiment of the present invention has addressed noise removal in several processes. In FIG. 1, at a step 108, the noise level of the image is measured. This process is described in detail in FIG. 13. In FIG. 13, at a step 1304, a threshold noise level for the image is determined. Taking an independent measurement of the noise level of each image facilitates the ability of the present invention to function with images of arrays of various sizes and densities and to adjust its efficacy to variations in noise intensity among different images. In FIG. 1, at a step 114, single pixel centers of the objects are located. This process is described in detail in FIG. 20. In FIG. 20, at a step 2002 and 2004, the image is, respectively, bandpass and lowpass filtered. This has the effect of reducing the intensity of small items on the image, presumably noise. Hence noise is filtered as a function of object size. At a step 2028, the image is threshold filtered with a threshold level directly proportional to the threshold noise level determined at a step 1304. This has the effect of filtering noise as a function of intensity. The process described in detail in FIGS. 28A and 28B represents another, and final, effort within the preferred embodiment to remove any noise that may have remained on the image. In the process described in FIGS. 28A and 28B, noise is filtered as a function of location on the image. For optimal results, the process outlined in FIGS. 28A and 28B requires both an image of centers aligned on their sub-grids and rotated to a desired angle of orientation and an image of repositioned objects within their corresponding aligned sub-grids and rotated to a desired angle of orientation. In the preferred embodiment, these are the images created, respectively, at a step 2528 and 2710. However, one skilled in the art will recognize that an image rotated to a desired angle of orientation, without having objects repositioned within their corresponding aligned sub-grids, may also be used but will produce less accurate results. This is the image created during a step 1112.

In FIG. 28A, at a step 2802, the image of centers aligned on their sub-grids and rotated to a desired angle of orientation, created at a step 2528, is inverted. At a step 2804, a thinning filter is used on the inverted image of centers aligned on their sub-grids and rotated to a desired angle of orientation, to create a skeletal image. The thinning filter creates the skeletal image by copying the value stored in the pixel at each center into pixels extending in all four directions from this center pixel until similar extensions from neighboring center pixels are encountered.

In FIG. 28A, at a step 2806, either the image of repositioned objects within their corresponding aligned sub-grids and rotated to a desired angle of orientation, created at a step 2710, or the image rotated to a desired angle of orientation, created at a step 1112, is selected. At a step 2808, background pixels, on the selected image, are distinguished from object pixels. Objects are deemed to have a maximum size set equal to a multiple of the filter size parameters determined at a step 1416 for both dimensions. In the preferred embodiment, the maximum size is set equal to the product of 1.5 times a function of the maxima of the filter size parameters. At a step 2810, the values of these distinguished pixels are equalized, thereby creating a background-corrected image. At a step 2812, the background-corrected image is bandpass filtered. In the preferred embodiment, a bandpass filter with an attenuation strength, at the maximum frequency, set equal fifty times the average intensity of the image. The upper cutoff frequency of the bandpass filter is set equal to the product of 1.5 times a function of the maxima of the filter size parameters determined at a step 1416 for both dimensions. The lower cutoff frequency of the bandpass filter equals three pixels. Bandpass filtering with a filter of this attenuation strength and size greatly increases the contrast between objects and the background and reduces the level of noise on the image. The resultant bandpass filtered image is nearly binary in appearance with light objects against a dark background. At a step 2814, pixels, on the bandpass filtered image, with values that are less than an automatically selected first threshold level are identified. At a step 2816, the values of these identified pixels are reset to equal the value of background pixels, thereby creating a first threshold filtered image. At a step 2818, the value of each pixel, on the first threshold filtered image, is decremented, thereby creating a decremented image.

In the preferred embodiment, the value stored in each pixel is decremented by fifty to ensure that no pixel has a value greater than 205.

Figure 29:
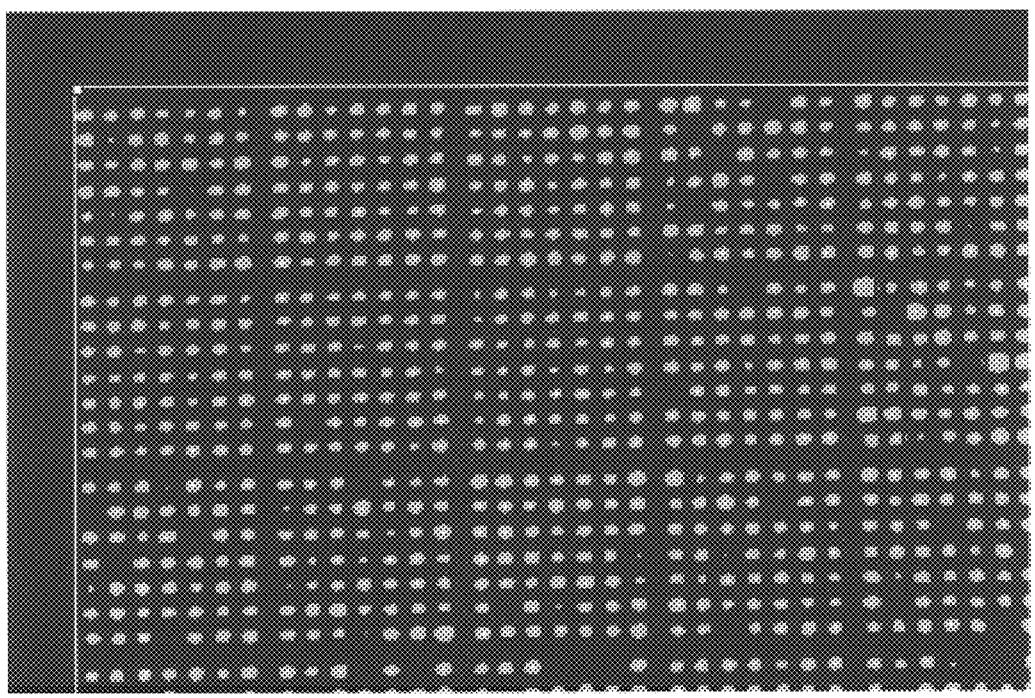

In FIG. 28A, at a step 2820, the skeletal image, created at a step 2804, is added to the decremented image, created at a step 2018, creating a sum image. The resultant sum image includes objects, represented by pixels with a maximum value of 205, superimposed on a skeletal image of centers aligned on their sub-grids. Where centers and objects coincide, the pixel representing the center has a value of 255. In FIG. 28B, at a step 2822, pixels, on the sum image, with values that are less than an automatically selected second threshold level are identified. At a step 2824, the values of these identified pixels are reset to equal the value of background pixels, thereby creating a second threshold filtered image. In the preferred embodiment, the second threshold level is set equal to a pixel value of two. At a step 2826, object pixels, on the second threshold filtered image, are distinguished from background pixels. At a step 2828, independent objects are defined from among the distinguished object pixels. At a step 2830, independent objects, wherein none of the pixels has a maximum possible value of 255, are identified from among the defined independent objects. Finally, at a step 2832, the values of the pixels, of these identified independent objects, on the second threshold filtered image, are reset to equal the value of background pixels, thereby creating an image with noise removed. The process outlined in FIGS. 28A and 28B can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually. FIG. 29 shows an image of objects superimposed on an image of centers aligned on their sub-grids.

Note the greater degree of brightness of the centers at those locations where centers and objects coincide.

Figure 30:
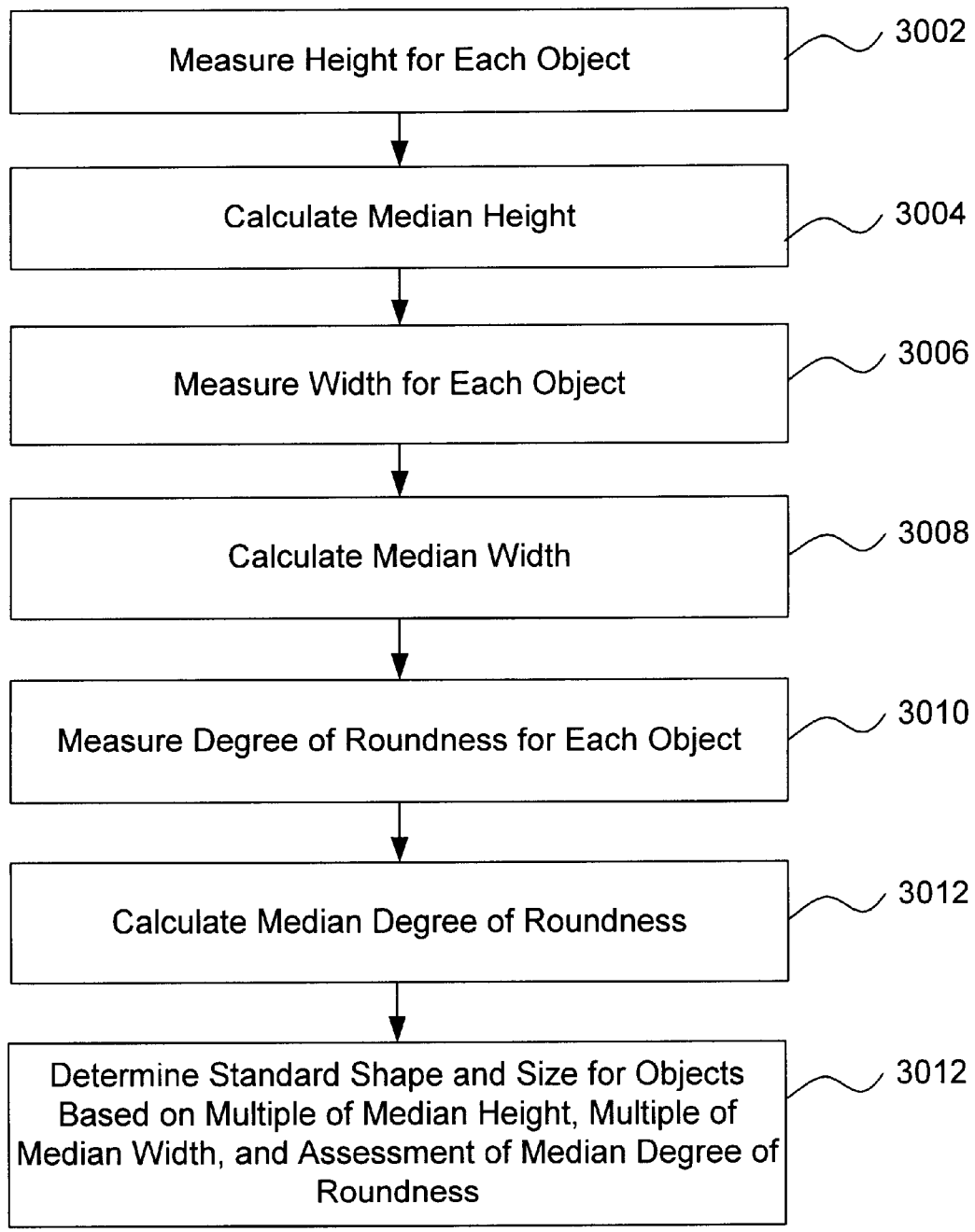

In FIG. 1, at a step 126, a standard shape and size for the objects is determined. FIG. 30 includes an operational block diagram for the process by which a standard shape and size for the objects is determined, but one skilled in the art will recognize that there are other ways in which one can determine a standard shape and size for the objects. For optimal results, the process outlined in FIG. 30 requires an image of repositioned objects within their corresponding aligned sub-grids, with noise removed, and rotated to a desired angle of orientation. If, in the preferred embodiment, an image of repositioned objects within their corresponding aligned sub-grids and rotated to a desired angle of orientation was used in the process explained in FIG. 28, then this is the image created during a step 2832. In FIG. 30, at a step 3002, the height of each object is measured. At a step 3004, a median of the measured heights is calculated. At a step 3006, the width of each object is measured. At a step 3008, a median of the measured widths is calculated. At a step 3010, the degree of roundness of each object is measured. At a step 3012, a median degree of roundness is calculated. At a step 3014, a standard shape and size are determined for the objects based on a multiple of the median height, a multiple of the median width, and an assessment of the median degree of roundness. In the preferred embodiment, the standard size is determined by the product of 1.1 times both the median height and the median width. However, other multiples can be used as would be apparent to a person skilled in the relevant art. The median degree of roundness is assessed to determine whether the objects are ellipses or rectangles. The process outlined in FIG. 30 can be performed manually or automatically based on a decision made by the user, via a dialog box included in the graphical user interface (not shown), before initiating the method. If the user decides to perform this process automatically, the user, before initiating the method, can also choose, via a dialog box included in the graphical user interface, to edit the results manually. When the process is performed manually or when the user edits the results of an automatically performed process, values for the standard height, standard width, and standard shape of the objects can be entered by the user via dialog boxes included in the graphical user interface.

In FIG. 1, at a step 128, the final image of the grid overlay is created. FIG. 31 shows an example of a final image of a grid overlay.

Figure 32A:
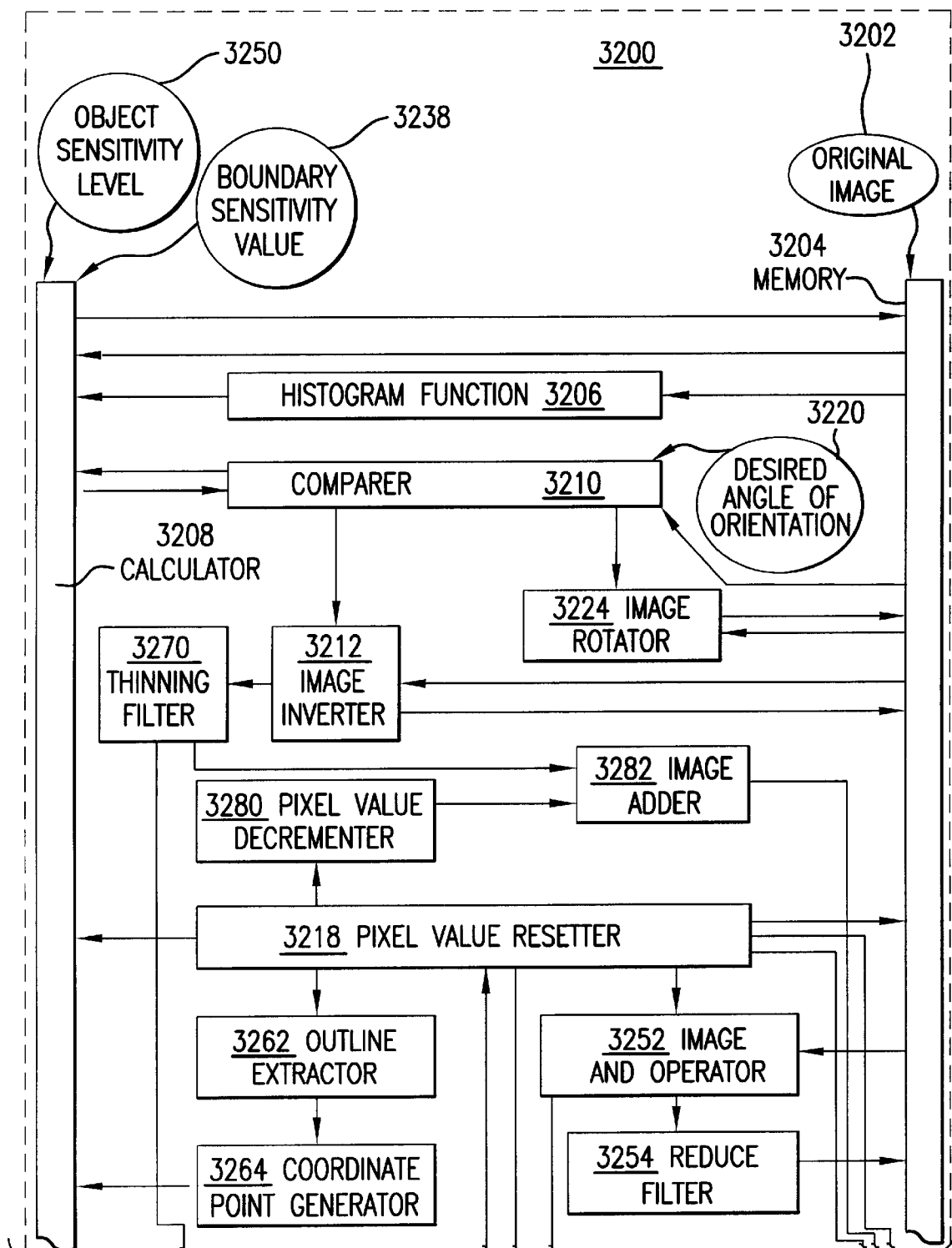
FIGS. 32A, 32B, and 32C show a block diagram of a system for a preferred embodiment of the present invention.
Figure 32B:
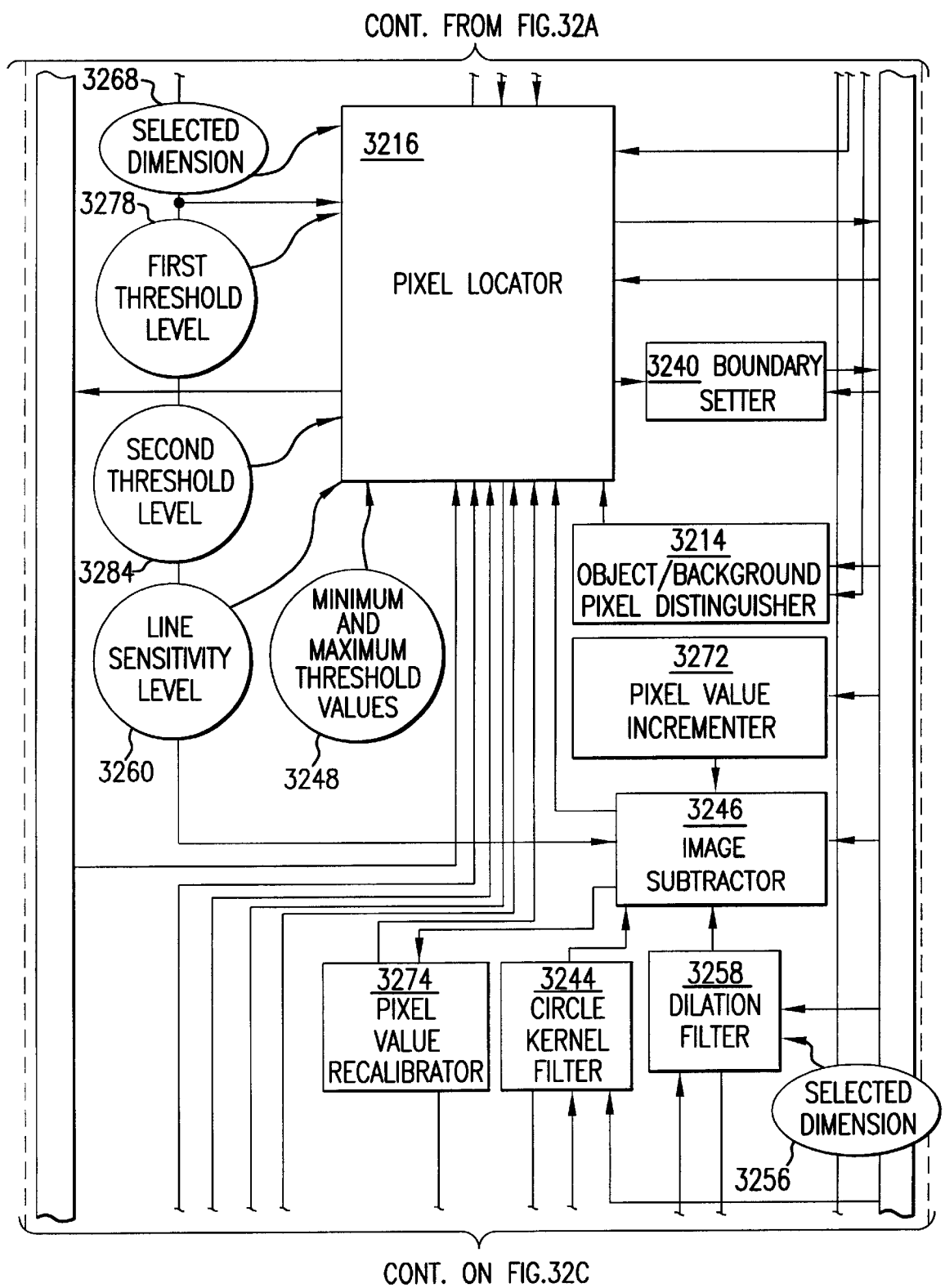
Figure 32C:
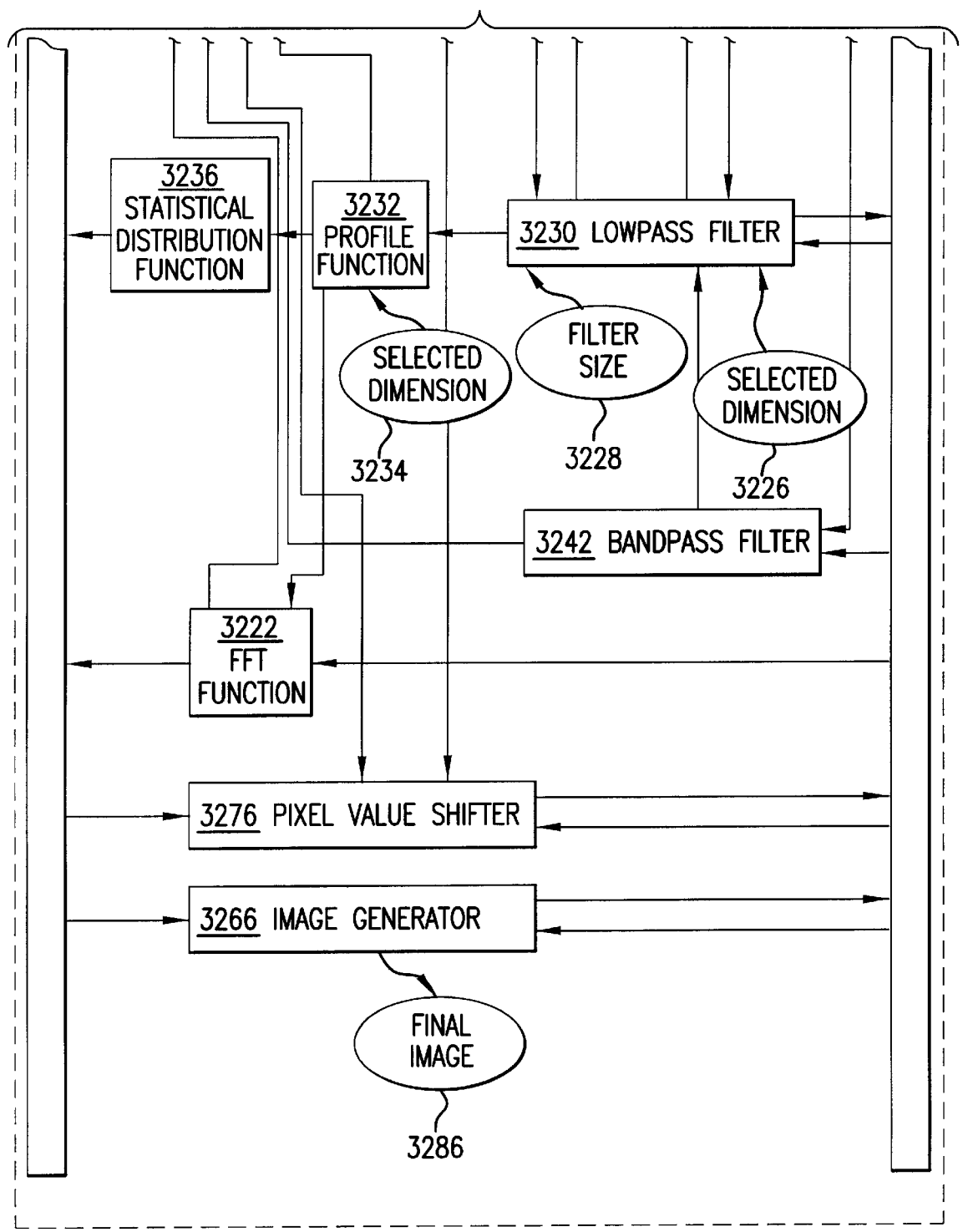

FIGS. 32A, 32B, and 32C show a block diagram of a system 3200 for a preferred embodiment of the present invention. The transfer of data within system 3200 will be described in reference to the method of a preferred embodiment as presented above.

One skilled in the art will recognize that the above described method can be implemented using a collection of subsystems comprising hardware, software, firmware, or a combination thereof. Many of these different subsystems involve common portions that can be implemented as modules such that a single module can be utilized in one or more subsystems. The subsystems are coupled together or otherwise communicate and share data and system resources to achieve the recited functions described herein. One skilled in the art will also recognize that there are other systems which can execute the processes of the present invention. Therefore, system embodiments of the present invention should not be limited to the system presented below.

The system can include an image inversion subsystem. In FIG. 32A, an original image 3202 is stored in memory 3204. In a preferred embodiment, a determination is made as to whether the image is negative. If it is, the image is converted to positive. To determine whether the image is positive or negative, a histogram function module 3206 receives the image from memory 3204 and prepares a histogram of it. Using the histogram, a calculator 3208 calculates a third order moment of the histogram. The results of this calculation are received by a comparer 3210 which determines whether the value of the third order moment is positive or negative. If the third order moment is negative, an image inverter 3212 is activated. The image inverter 3212 receives the image from memory 3204, inverts the image, and stores the inverted image in memory 3204.

The system can include a background correction subsystem. In a preferred embodiment, the image is corrected for fluctuations in intensity of energy emitted in the background. The image is received from memory 3204 by an object/background pixel distinguisher 3214 which passes both the image and the criteria for distinguishing object pixels from background pixels to a pixel locator 3216. Pixel locator 3216 distinguishes the object pixels from the background pixels. Pixel value resetter 3218 equalizes the value of the background pixels. The background-corrected image is stored in memory 3204.

The system can include an array alignment subsystem. In a preferred embodiment, the array is aligned with the borders of the image. The user selects a desired angle of orientation between the rows and columns of the array and the boundaries of the image 3220. This information is sent to the comparer 3210. A fast fourier transform module 3222 receives the image from memory 3204 and prepares a fast fourier transform spectrum of it. The resulting fast fourier transform spectrum is sent to the pixel locator 3216 where the pixels in the central portion of the fast fourier transform spectrum are located. The pixel value resetter 3218 sets the value of these pixels equal to the value of the background pixels. The calculator 3208 determines the maximum frequency of this modified fast fourier transform spectrum and then uses the maximum frequency to calculate an actual angle of orientation between the rows and columns of the array and the boundaries of the image. This image is also sent to the comparer 3210, which activates an image rotator 3224. The image rotator 3224 receives the image from memory 3204, rotates the image to the desired angle of orientation 3220, and stores the image rotated to the desired angle of orientation in memory 3204.

The system can include a noise measurement subsystem. In a preferred embodiment, a measurement is made of the level of noise on the image. This measurement is accomplished using the same fast fourier transform spectrum, modified to have pixels in the central portion set equal to the value of the background pixels, as was used to rotate the image to the desired angle of orientation. The two processes are typically performed together. The modified fast fourier transform spectrum is sent from the pixel value resetter 3218 to the pixel locator 3216. The pixel locator 3216 selects one of the four quadrants of the modified fast fourier transform spectrum. The calculator 3208 determines the average value of pixels in this quadrant and then uses the average to set a threshold noise level. The threshold noise level is stored in memory 3204. For optimal results, subsequent processing should be applied to a positive image with a flat background in which the rows and columns of the array are aligned, as closely as possible, with the rows and columns of image pixels.

The system can include a subsystem to calculate parameters for digital image processing filters. In a preferred embodiment, parameters for digital image processing filter sizes are calculated. One of two dimensions is selected 3226. The user selects a lowpass filter size 3228. The image is received from memory 3204 by a lowpass filter 3230 which filters the image along the selected dimension 3226 to produce an image with linear bands. This image is sent to a profile function module 3232. The profile function module 3232 also receives a selected dimension 3234. Selected dimension 3234 is the opposite dimension of selected dimension 3226. The profile function module 3232 prepares a profile of pixel values along selected dimension 3234. This profile is sent to the fast fourier transform module 3222 which prepares a fast fourier transform spectrum of it. The calculator 3208 determines the maximum frequency of this fast fourier transform spectrum and then uses the maximum frequency to determine a filter size parameter for selected dimension 3234. The filter size parameter is stored in memory 3204. This process is repeated for the other dimension.

The system can include a subsystem to define array boundaries. In a preferred embodiment, boundaries for the array are defined. The boundaries are defined using the same profiles that were used to determine the filter size parameters. The two processes are typically performed together. The boundaries are defined in pairs that correspond to selected dimension 3234. For each pair, the profile is sent from the profile function module 3232 to a statistical distribution function module 3236. Statistical distribution function module 3236 prepares a statistical distribution of the profile of pixel values along selected dimension 3234. The statistical distribution is sent to the calculator 3208. The user selects a boundary sensitivity value 3238. This information is also sent to the calculator 3208. The calculator 3208 uses the statistical distribution and the boundary sensitivity value 3238 to calculate a threshold value which is stored in memory 3204. For each pair, the profile is also sent from the profile function module 3232 to the pixel locator 3216. The pixel locator 3216 also receives the threshold value from memory 3204 and locates, along the profile, the positions of the first and last pixels with values equal to the threshold value. The location of these pixels is sent to a boundary setter 3240. Boundary setter 3240 receives the image from memory 3204, sets the pair of boundaries that correspond to selected dimension 3234, and stores the bounded image in memory 3204. This process is repeated for the other dimension.

The system can include a subsystem to locate the single pixel centers of the objects. In a preferred embodiment, single pixel centers of the objects are located. The image is received from memory 3204 by a bandpass filter 3242 which bandpass filters the image. The bandpass filtered image is lowpass filtered by the lowpass filter 3230. A copy of the lowpass filtered image is stored in memory 3204. The original lowpass filtered image is received by a circle kernel filter 3244. The circle kernel filter 3244 dilates, in all directions, objects on the lowpass filtered image. The dilated image is sent to an image subtractor 3246. The image subtractor 3246 retrieves from memory 3204 a copy of the lowpass filtered image and subtracts it from the dilated image to create a difference image. Minimum and maximum threshold values are selected 3248. This information is sent to the pixel locator 3216. The pixel locator 3216 also receives the difference image from the image subtractor 3246 and locates, on the difference image, the positions of pixels with values that are not between the minimum and maximum threshold values 3248. The pixel value resetter 3218 sets the value of these pixels equal to the value of the background pixels. The threshold filtered image is stored in memory 3204.

Another copy of the lowpass filtered image is retrieved from memory 3204 by the object/background pixel distinguisher 3214 which passes both the lowpass filtered image and the criteria for distinguishing object pixels from background pixels to the pixel locator 3216. Pixel locator 3216 distinguishes the object pixels from the background pixels. Pixel value resetter 3218 equalizes the value of the background pixels. The background-corrected image is sent to the pixel locator 3216. The user selects an object sensitivity level 3250. This information is sent to the calculator 3208. The calculator 3208 retrieves from memory 3204 the threshold noise level and divides it by the object sensitivity level 3250 to set a threshold level. The threshold level is sent to the pixel locator 3216. The pixel locator 3216, also having received the background-corrected image, locates, on the background-corrected image, the positions of pixels with values that are less than the threshold level. The pixel value resetter 3218 sets the value of these pixels equal to the value of the background pixels. This threshold filtered image is sent to an image AND operator 3252. The image AND operator 3252 also retrieves from memory 3204 the previous threshold filtered image and performs a Boolean AND function between corresponding pixels of the two images. This logic output image is sent to a reduce filter 3254. The reduce filter 3254 reduces the size of objects on the image to a single pixel. This image of single pixel centers of the objects is stored in memory 3204.

The system can include a subsystem to create both horizontal and vertical polynomial segments that approximate lines that pass through the single pixel centers of the objects. In a preferred embodiment, horizontal and vertical polynomial segments are created which approximate lines that pass through the single pixel centers of the objects. The image of single pixel centers of the objects is received from memory 3204 by the circle kernel filter 3244 which dilates, in all directions, objects on the image of single pixel centers of the objects. One of two dimensions is selected 3226. The dilated image is received by the lowpass filter 3230 which filters the image along the selected dimension 3226. A copy of the lowpass filtered image is stored in memory 3204. A selected dimension 3256 is also received by a dilation filter 3258. Selected dimension 3256 is the opposite dimension of selected dimension 3226. The dilation filter 3258 dilates the lowpass filtered image along the selected dimension 3256. The dilated image is sent to the image subtractor 3246. The image subtractor 3246 retrieves from memory 3204 a copy of the lowpass filtered image and subtracts it from the dilated image to create a difference image. Minimum and maximum threshold values are selected 3248. This information is sent to the pixel locator 3216. The pixel locator 3216 also receives the difference image from the image subtractor 3246 and locates, on the difference image, the positions of pixels with values that are not between the minimum and maximum threshold values 3248. The pixel value resetter 3218 sets the value of these pixels equal to the value of the background pixels. This threshold filtered image is sent to the image AND operator 3252. The image AND operator 3252 also retrieves from memory 3204 a copy of the lowpass filtered image and performs a Boolean AND function between corresponding pixels of the two images. This logic output image is sent to pixel locator 3216.

The user selects a line sensitivity level 3260. This information is sent to the pixel locator 3216. The pixel locator 3216, also having received the logic output image, locates, on the logic output image, the positions of pixels with values that are less than the line sensitivity level 3260. The pixel value resetter 3218 sets the value of these pixels equal to the value of the background pixels. This threshold filtered image is sent to an outline extractor 3262. The outline extractor 3262 extracts outlines only of lines that entirely traverse the array. The image of extracted outlines is passed to a coordinate point generator 3264. The coordinate point generator 3264 creates a set of coordinate points for each extracted outline such that each set of coordinate points is equally distributed along its corresponding extracted outline. The coordinate points are sent to the calculator 3208 which derives a polynomial function for each set of coordinate points. The coefficient values for each derived polynomial function are stored for subsequent processing in memory 3204. This process is repeated for the other dimension. When polynomial functions have been derived for both dimensions, the coefficient values stored in memory 3204 are received by an image generator 3266 which creates an image of polynomial segments that approximate the lines that pass through the single pixel centers of the objects. This image of polynomial segments is stored in memory 3204. Calculator 3208 uses the image of polynomial segments to derive intercept points for the polynomial functions. The image generator 3266 creates an image of intercepts of polynomial segments. This image of intercepts of polynomial segments is stored in memory 3204.

The system can include a sub-grid identifying subsystem. In a preferred embodiment, sub-grids within the array are identified. One of two dimensions is selected 3268. This information is sent to the pixel locator 3216. The pixel locator 3216 also receives from memory 3204 the image of polynomial segments and locates, for polynomial segments in the selected dimension 3268, the center of each polynomial segment. Calculator 3208 measures the distance between each consecutive center. Each measured distance is stored in memory 3204. Calculator 3208 then calculates a median value of the measured distances and determines a threshold value equal to a multiple of the median value. This threshold value is sent to the comparer 3210. Starting at one end of the array, parallel to the polynomial segments in selected dimension 3268, and proceeding towards the other end, comparer 3210 compares each measured distance stored in memory 3204 with the threshold value until a measured distance exceeds the threshold value. For each comparison, calculator 3208 accumulates a count. When the measured distance exceeds the threshold value, the value of the accumulated count is stored in memory 3204. This comparing, accumulating, and storing process is repeated until the opposite end of the array is reached. Afterwards, calculator 3208 calculates a median and a sum of the stored accumulated counts. Calculator 3208 then divides the sum by the median to determine the size, in the selected dimension 3268, of the sub-grids. This process is repeated for the other dimension. Calculator 3208 determines coordinate points to identify the sub-grids within the array. These coordinate points are stored in memory 3204.

The system can include a subsystem to align centers on their sub-grids. In a preferred embodiment, centers are aligned on their sub-grids. The image of intercepts of polynomial segments is received from memory 3204 by the image inverter 3212 which inverts the image of intercepts of polynomial segments. The inverted image is sent to a thinning filter 3270. Thinning filter 3270 creates a skeletal image of cells from the inverted image of intercepts of polynomial segments by dilating objects on the image along two perpendicular dimensions. The skeletal image of cells is sent to the pixel locator 3216 which defines an area of interest surrounding each intercept. Calculator 3208 determines coordinate points for each area of interest surrounding each intercept. These coordinate points are stored in memory 3204.

The image of single pixel centers of the objects is received from memory 3204 by a pixel value incrementer 3272. The pixel value incrementer 3272 increments the value of each pixel in the image of single pixel centers of the objects. The incremented image is sent to the image subtractor 3246. The image subtractor 3246 also receives the skeletal image of cells and subtracts it from the incremented image to create a difference image. The difference image is sent to a pixel value recalibrator 3274. The pixel value recalibrator 3274 recalibrates the values of the pixels in the difference image. The recalibrated image is sent to the pixel locator 3216 which locates the position, within each cell, of the pixel with a maximum value. The pixel locator 3216 and calculator 3208 also determine a value and position for the "center of mass" of each cell.

The pixel locator 3216 also receives from memory 3204 the coordinate points for each area of interest surrounding each intercept. The pixel locator 3216 determines the location of the pixel with a maximum value, if such a pixel exists, within the area of interest surrounding each corresponding intercept. For each located pixel with a maximum value within the area of interest surrounding the corresponding intercept, calculator 3208 determines both the horizontal displacement and the vertical displacement between the pixel with a maximum value and its corresponding intercept. Each determined horizontal displacement and vertical displacement is stored in memory 3204 and identified by its intercept.

Still holding the recalibrated image, the pixel locator 3216 receives from memory 3204 the coordinate points that identify the sub-grids within the array. The pixel locator 3216 matches each intercept with its corresponding sub-grid. For each identified sub-grid, calculator 3208 uses the matched intercepts and retrieves from memory 3204 the corresponding determined horizontal displacements and vertical displacements. For each identified sub-grid, calculator 3208 calculates an average of the horizontal displacements and an average of the vertical displacements. For each identified sub-grid, the value of the average horizontal displacement and the value of the average of vertical displacement are stored in memory 3204.

The recalibrated image is also sent to a pixel value shifter 3276. For each identified sub-grid, the value of the average horizontal displacement and the value of the average vertical displacement are received from calculator 3208 by the pixel value shifter 3276. For each identified sub-grid, the pixel value shifter 3276 shifts the value of pixels within the sub-grid from an original pixel position to a new pixel position located in the direction corresponding to the calculated average horizontal displacement and average vertical displacement. The resultant image of centers aligned on their sub-grids is stored in memory 3204.

The system can include a subsystem to reposition objects on their corresponding aligned centers on the identified sub-grids. In a preferred embodiment, objects are repositioned on their corresponding aligned centers on the identified sub-grids. The image rotated to the desired angle of orientation is received from memory 3204 by the object/background pixel distinguisher 3214 which passes both the image rotated to the desired angle of orientation and the criteria for distinguishing object pixels from background pixels to a pixel locator 3216. Pixel locator 3216 distinguishes the object pixels from the background pixels. The pixel locator 3216 also receives from memory 3204 the image of centers aligned on their sub-grids. The pixel locator 3216 compares the image rotated to the desired angle of orientation to the image of centers aligned on their sub-grids. The pixel locator 3216 identifies those objects on the image rotated to the desired angle of orientation that have a corresponding pixel with a maximum value on the image of centers aligned on their sub-grids. The pixel locator 3216 then receives from memory 3204 the coordinate points that identify the sub-grids within the array. The pixel locator 3216 matches each identified object, with a corresponding pixel with a maximum value, with its corresponding sub-grid. With those objects with a corresponding pixel with a maximum value identified and matched with their corresponding sub-grids, the image rotated to the desired angle of orientation is sent from memory from the pixel locator 3216 to the pixel value shifter 3276. For each identified sub-grid, the value of the average horizontal displacement and the value of the average vertical displacement are received from memory 3204 by the pixel value shifter 3276. For each identified sub-grid, the pixel value shifter 3276 shifts the value of those pixels corresponding to objects identified with a corresponding pixel with a maximum value from an original pixel position to a new pixel position located in the direction corresponding to the calculated average horizontal displacement and average vertical displacement. The resultant image of objects repositioned within their corresponding aligned sub-grids is stored in memory 3204.

The system can include a noise removal subsystem. In a preferred embodiment, noise is removed from the image. The image of centers aligned on their sub-grids is received from memory 3204 by the image inverter 3212, which inverts the image of centers aligned on their sub-grids and sends it to the thinning filter 3270. The thinning filter 3270 creates a skeletal image from the inverted image of centers aligned on their sub-grids by dilating objects on the image along two perpendicular dimensions.

Either the image rotated to the desired angle of orientation or the image of objects repositioned within their corresponding aligned sub-grids is selected. The image is received from memory 3204 by an object/background pixel distinguisher 3214 which passes both the image and the criteria for distinguishing object pixels from background pixels to a pixel locator 3216. Pixel locator 3216 distinguishes the object pixels from the background pixels. Pixel value resetter 3218 equalizes the value of the background pixels. The background-corrected image is sent to the bandpass filter 3242 which bandpass filters the background-corrected image. The bandpass filtered image is sent to the pixel locator 3216. A first threshold level is selected 3278. This information is also sent to the pixel locator 3216. The pixel locator 3216 locates, on the bandpass filtered image, the positions of pixels with values that are less than the first threshold level 3278. The pixel value resetter 3218 sets the value of these pixels equal to the value of the background pixels. This first threshold filtered image is sent to a pixel value decrementer 3280. The pixel value decrementer 3280 decrements the value of each pixel in the first threshold filtered image.

The decremented image is sent to an image adder 3282. The image adder 3282 also receives the skeletal image created from the inverted image of centers aligned on their sub-grids and adds it to the decremented image to create a sum image. The sum image is sent to the pixel locator 3216. A second threshold level is selected 3284. This information is also sent to the pixel locator 3216. The pixel locator 3216 locates, on the sum image, the positions of pixels with values that are less than the second threshold level 3284. The pixel value resetter 3218 sets the value of these pixels equal to the value of the background pixels. The second threshold filtered image is received from the image adder 3282 by the object/background pixel distinguisher 3214 which passes both the image and the criteria for distinguishing object pixels from background pixels to the pixel locator 3216. Pixel locator 3216 distinguishes the object pixels from the background pixels. The pixel locator 3216 defines independent objects among the distinguished object pixels. The pixel locator 3216 identifies, among the defined independent objects, those independent objects wherein none of the pixels has a maximum possible value. The pixel value resetter 3218 sets the value of these pixels equal to the value of the background pixels. The resultant noise-free image is stored in memory 3204.

The system can include a subsystem to determine a standard shape and size for the objects. In a preferred embodiment, a standard shape and size for the objects is determined. The noise-free image is received from memory 3204 by an object/background pixel distinguisher 3214 which passes both the image and the criteria for distinguishing object pixels from background pixels to a pixel locator 3216. Pixel locator 3216 distinguishes the object pixels from the background pixels. Calculator 3208 measures a height for each object and calculates a median height. Calculator 3208 measures a width for each object and calculates a median width. Calculator 3208 measures a degree of roundness for each object and calculates a median degree of roundness. Calculator 3208 determines a standard shape and size for the objects based on a multiple of the median height, a multiple of the median width, and an assessment of the median degree of roundness. The system can include a subsystem to create the final image of a grid overlay. These parameters are sent to the image generator 3266. The image generator 3266 also receives from memory 3204 the image of centers aligned on their sub-grids. Using the determined standard shape and size and the image of centers aligned on their sub-grids, the image generator 3266 creates the final image of the grid overlay 3286 wherein each object has a standard shape and size and is positioned in relation to its corresponds to its center.

In general, system 3200 of the present invention can be implemented in software, firmware, hardware, or a combination thereof.

Environment of the Invention

Figure 33:
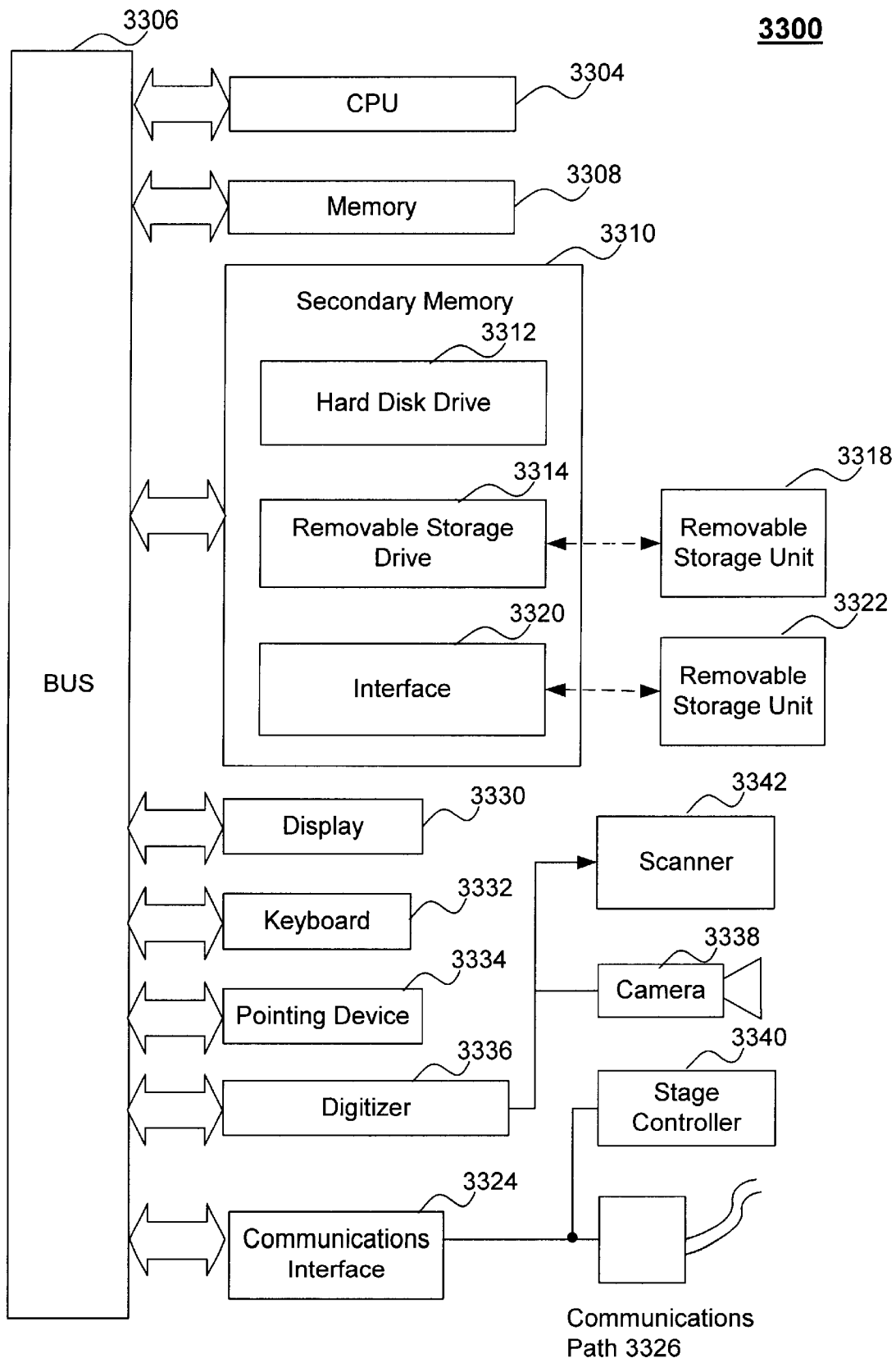
FIG. 33 is a block diagram illustrating an example environment in which the present invention can operate.

FIG. 33 is a block diagram illustrating an example environment in which the present invention can operate. The environment is a computer system 3300 that includes one or more processors, such as a central processing unit (CPU) 3304. The CPU 3304 is connected to a communications bus 3306. Various software embodiments are described in terms of this example computer system. After reading this description, it will be apparent to a person skilled in the relevant art how to implement the invention using other computer systems and/or computer architectures.

Computer system 3300 also includes a main memory 3308, preferably random access memory (RAM), and can also include a secondary memory 3310. The secondary memory 3310 can include, for example, a hard disk drive 3312 and/or a removable storage drive 3314, representing a floppy disk drive, a magnetic tape drive, an optical disk drive, etc. The removable storage drive 3314 reads from and/or writes to a removable storage unit 3318 in a well known manner. Removable storage unit 3318 represents a floppy disk, magnetic tape, optical disk, etc., which is read by and written to by removable storage drive 3314. As will be appreciated, the removable storage unit 3318 includes a computer usable storage medium having stored therein computer software and/or data.

The computer system 3300 also includes conventional hardware such as a display 3330, a keyboard 3332, and a pointing device 3334. A digitizer 3336 and a camera 3338 or scanner 3342 can be used for capturing images to process according to the present invention. Alternatively, images can be retrieved from any of the above-mentioned memory units, or via a communications interface 3324.

In alternative embodiments, secondary memory 3310 may include other similar means for allowing computer programs or other instructions to be loaded into computer system 3300. Such means can include, for example, a removable storage unit 3322 and an interface 3320. Examples can include a program cartridge and cartridge interface (such as that found in video game devices), a removable memory chip (such as an EPROM, or PROM) and associated socket, and other removable storage units 3322 and interfaces 3320 which allow software and data to be transferred from the removable storage unit 3322 to computer system 3300.

The communications interface 3324 allows software and data to be transferred between computer system 3300 and external devices via communications path 3326. Examples of communications interface 3324 can include a modem, a network interface (such as an Ethernet card), a communications port (e.g., RS-232), etc. Software and data transferred via communications interface 3324 are in the form of signals which can be electronic, electromagnetic, optical or other signals capable of being received by communications interface 3324 via communications path 3326. Note that communications interface 3324 provides a means by which computer system 3300 can interface to a network such as the Internet.

The present invention is described in terms of this example environment. Description in these terms is provided for convenience only. It is not intended that the invention be limited to application in this example environment. In fact, after reading the complete description, it will become apparent to a person skilled in the relevant art how to implement the invention in alternative environments.

Software and Hardware Embodiments

The present invention is preferably implemented using software running (that is, executing) in an environment similar to that described above with respect to FIG. 33. In this document, the term "computer program product" is used to generally refer to removable storage device 3318 or a hard disk installed in hard disk drive 3312. These computer program products are means for providing software to computer system 3300.

Computer programs (also called computer control logic) are stored in main memory and/or secondary memory 3310. Computer programs can also be received via communications interface 3324. Such computer programs, when executed, enable the computer system 3300 to perform the features of the present invention as discussed herein. In particular, the computer programs, when executed, enable the processor 3304 to perform the features of the present invention. Accordingly, such computer programs represent controllers of the computer system 3300.

In an embodiment where the invention is implemented using software, the software may be stored in a computer program product and loaded into computer system 3300 using removable storage drive 3314, hard drive 3312 or communications interface 3324. Alternatively, the computer program product may be downloaded to computer system 3300 over communications path 3326. The control logic (software), when executed by the processor 3304, causes the processor 3304 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for analyzing a digitized original image of an array of objects to create a final image of a grid overlay, comprising:

(a) preparing a histogram of the original or an intermediate image;

(b) calculating a third order moment of said prepared histogram;

(c) determining if said calculated third order moment is positive or negative;

(d) inverting the original or the intermediate image if said calculated third order moment is negative, thereby creating a new intermediate image;

(e) locating the center of each object;

(f) determining a standard shape and size for the objects; and (g) creating the final image of the grid overlay wherein each object has said determined standard shape and size and wherein each object is positioned in relation to its corresponding center.

2. The method according to claim 1, further comprising thereafter manually editing said created new intermediate image.

3. A method for analyzing a digitized original image of an array of objects to create a final image of a grid overlay, comprising:

(a) selecting a desired angle of orientation between rows and columns of the array and boundaries of the original or an intermediate image;

(b) creating a fast fourier transform spectrum of the original or an intermediate image;

(c) setting pixel values for a central portion of said created fast fourier transform spectrum equal to the value of background pixels;

(d) determining a maximum frequency from said created fast fourier transform spectrum;

(e) using said determined maximum frequency to calculate an actual angle of orientation between rows and columns of the array and boundaries of the original or an intermediate image;

(f) rotating the original or an intermediate image to said selected desired angle of orientation, thereby creating an intermediate image with a desired angle of orientation;

(g) locating the center of each object;

(h) determining a standard shape and size for the objects; and (i) creating the final image of the grid overlay wherein each object has said determined standard shape and size and wherein each object is positioned in relation to its corresponding center.

4. The method according to claim 3, wherein said selected desired angle of orientation is an automatic default angle of orientation.

5. The method according to claim 3, further comprising thereafter manually editing said created intermediate image with a desired angle of orientation.

6. A method for analyzing a digitized original image of an array of objects to create a final image of a grid overlay, comprising:

(a) creating a fast fourier transform spectrum of the original or an intermediate image;

(b) setting pixel values for a central portion of said created fast fourier transform spectrum equal to the value of background pixels;

(c) determining an average of pixel values for pixels in an area of interest in a middle portion of one of four quadrants of said created fast fourier transform spectrum;

(d) using said determined average value to set a threshold noise level;

(e) locating the center of each object;

(f) determining a standard shape and size for the objects; and (g) creating the final image of the grid overlay wherein each object has said determined standard shape and size and wherein each object is positioned in relation to its corresponding center.

7. The method according to claim 6, further comprising thereafter manually editing said set threshold noise level.

8. A method for analyzing a digitized original image of an array of objects to create a final image of a grid overlay, comprising:

(a) selecting a lowpass filter size for use in one of two dimensions;

(b) lowpass filtering the original or an intermediate image along the selected dimension, thereby creating a lowpass filtered image;

(c) locating linear bands created on said lowpass filtered image;

(d) forming a line of pixels, on said lowpass filtered image, substantially perpendicular to said linear bands;

(e) developing a profile of said formed line of pixels;

(f) preparing a fast fourier transform spectrum of said developed profile;

(g) determining a maximum frequency from said prepared fast fourier transform spectrum;

(h) using said determined maximum frequency to determine a filter size parameter;

(i) repeating steps (a) through (h) for another dimension;

(j) locating the center of each object;

(k) determining a standard shape and size for the objects; and (l) creating the final image of the grid overlay wherein each object has said determined standard shape and size and wherein each object is positioned in relation to its corresponding center.

9. The method according to claim 8, wherein said selected lowpass filter size is an automatic default lowpass filter size.

10. The method according to claim 8, further comprising thereafter manually editing said determined filter size parameters.

11. A method for analyzing a digitized original image of an array of objects to create a final image of a grid overlay, comprising:

(a) selecting a lowpass filter size;

(b) lowpass filtering the original or an intermediate image in one of two dimensions, thereby creating a lowpass filtered image;

(c) locating linear bands created on said lowpass filtered image;

(d) forming a line of pixels, on said lowpass filtered image, substantially perpendicular to said linear bands;

(e) developing a profile of said formed line of pixels;

(f) preparing a statistical distribution of said developed profile;

(g) selecting a boundary sensitivity value;

(h) using said prepared statistical distribution and said selected boundary sensitivity value to calculate a threshold value;

(i) locating, along said developed profile, positions of first and last pixels equal to said calculated threshold value;

(j) setting array boundaries to correspond to said located positions of first and last pixels;

(k) repeating steps (a) through (j) for another dimension;

(l) locating the center of each object;

(m) determining a standard shape and size for the objects; and (n) creating the final image of the grid overlay wherein each object has said determined standard shape and size and wherein each object is positioned in relation to its corresponding center.

12. The method according to claim 11, wherein said selected lowpass filter size is an automatic default lowpass filter size.

13. The method according to claim 11, wherein said selected boundary sensitivity value is an automatic default boundary sensitivity value.

14. The method according to claim 11, further comprising thereafter manually editing said set array boundaries.

15. A method for analyzing a digitized original image of an array of objects to create a final image of a grid overlay, comprising:

(a) locating the center of each object;

(b) measuring, on the original or an intermediate image, a height for each object;

(c) calculating a median height;

(d) measuring, on the original or an intermediate image, a width for each object;

(e) calculating a median width;

(f) measuring, on the original or an intermediate image, a degree of roundness for each object;

(g) calculating a median degree of roundness;

(h) determining a standard shape and size for the objects based on a multiple of said median height, a multiple of said median width, and an assessment of said median degree of roundness; and (i) creating the final image of the grid overlay wherein each object has said determined standard shape and size and wherein each object is positioned in relation to its corresponding center.

16. The method according to claim 5, further comprising thereafter manually editing said determined standard shape and size for the objects.

17. A method for processing a digitized original image of an array of objects to produce a final image of a grid overlay of the array of objects, comprising:

(a) storing the digitized original image of the array of objects;

(b) processing said stored digitized original image of the array of objects to locate the center of each object in said stored digitized original image of the array of objects;

(c) processing said stored digitized original image of the array of objects to determine a uniform size for each object in the final image of the grid overlay of the array of objects based on a first measurement of each object in said stored digitized original image of the array of objects;

(d) processing said stored digitized original image of the array of objects to determine a uniform shape for each object in the final image of the grid overlay of the array of objects based on a second measurement of each object in said stored digitized original image of the array of objects; and (e) processing said stored digitized original image of the array of objects, instead of processing an original image of the grid overlay of the array of objects, to produce the final image of the grid overlay of the array of objects, wherein each object in the final image of the grid overlay of the array of objects has said determined uniform size and said determined uniform shape, and wherein each object in the final image of the grid overlay of the array of objects is positioned in relation to its corresponding said located center.

18. A system for processing a digitized image of an array of objects to produce a final image of a grid overlay of the array of objects, comprising:

a first subsystem that stores the digitized original image of the array of objects;

a second subsystem, coupled to said first subsystem, that processes the digitized original image of the array of objects to locate a center of each object in the digitized original image of the array of objects;

a third subsystem, coupled to said second subsystem, that processes the digitized original image of the array of objects to determine a uniform size for each object in the final image of the grid overlay of the array of objects based on a first measurement of each object in the digitized original image of the array of objects;

a fourth subsystem, coupled to said third subsystem, that processes the digitized original image of the array of objects to determine a uniform shape for each object in the final image of the grid overlay of the array of objects based on a second measurement of each object in the digitized original image of the array of objects; and a fifth subsystem, coupled to said fourth subsystem, that processes the digitized original image of the array of objects, instead of processing an original image of the grid overlay of the array of objects, to produce the final image of the grid overlay of the array of objects, wherein each object in the final image of the grid overlay of the array of objects has said uniform size and said uniform shape, and wherein each object in the final image of the grid overlay of the array of objects is positioned in relation to its corresponding said center.

19. A computer program product for processing a digitized original image of an array of objects to produce a final image of a grid overlay of the array of objects, said computer program product comprising:

a computer usable medium having computer readable program code means embodied in said medium for causing an application program to execute on a computer system, said computer readable program code means comprising:

a computer readable first program code means for causing said computer system to process the digitized original image of the array of objects to locate a center of each object in the digitized original image of the array of objects;

a computer readable second program code means for causing said computer system to process the digitized original image of the array of objects to determine a uniform size for each object in the final image of the grid overlay of the array of objects based on a first measurement of each object in the digitized original image of the array of objects;

a computer readable third program code means for causing said computer system to process the digitized original image of the array of objects to determine a uniform shape for each object in the final image of the grid overlay of the array of objects based on a second measurement of each object in the digitized original image of the array of objects; and a computer readable fourth program code means for causing said computer system to process the digitized original image of the array of objects, instead of processing an original image of the grid overlay of the array of objects, to produce the final image of the grid overlay of the array of objects, wherein each object in the final image of the grid overlay of the array of objects has said uniform size and said uniform shape, and wherein each object in the final image of the grid overlay of the array of objects is positioned in relation to its corresponding said center.

20. The method according to claim 19, further comprising beforehand inverting the original or an intermediate image.

21. The method according to claim 17, further comprising beforehand correcting background pixels on the original or an intermediate image.

22. The method according to claim 21, wherein said correcting comprises:

(a) distinguishing object pixels from background pixels; and (b) equalizing values of background pixels, thereby creating a new intermediate image.

23. The method according to claim 22, further comprising thereafter manually editing said created new intermediate image.

24. The method according to claim 17, further comprising beforehand aligning the array in relation to borders of the original or an intermediate image.

25. The method according to claim 17, further comprising beforehand measuring a noise level on the original or an intermediate image.

26. The method according to claim 17, further comprising beforehand calculating filter size parameters.

27. The method according to claim 17, further comprising beforehand defining boundaries for the array.

28. The method according to claim 17, further comprising, after said locating the center of each object but before said determining a standard shape and size for the objects, manually editing each said located center of each object.

29. The method according to claim 17, further comprising, after said locating the center of each object but before said determining a standard shape and size for the objects:

(a) identifying sub-grids within the array; and (b) aligning the centers on said identified sub-grids, thereby creating an intermediate image of centers aligned on their sub-grids.

30. The method according to claim 29, further comprising, after said identifying sub-grids within the array but before said aligning the centers on said identified sub-grids, manually editing said identified sub-grids within the array.

31. The method according to claim 29, further comprising thereafter manually editing said created intermediate image of centers aligned on their sub-grids.

32. The method according to claim 29, further comprising thereafter repositioning the objects on their corresponding said aligned centers on said identified sub-grids, thereby creating an intermediate image of repositioned objects within their corresponding sub-grids.

33. The method according to claim 32, further comprising thereafter manually editing said created intermediate image of repositioned objects within their corresponding sub-grids.

34. The method according to claim 17, further comprising, after said locating the center of each object but before said determining a standard shape and size for the objects, removing noise from the original or an intermediate image, thereby creating an intermediate image with noise removed.

35. The method according to claim 34, further comprising thereafter manually editing said created intermediate image with noise removed.

36. The system according to claim 18, further comprising an image inversion subsystem.

37. The system according to claim 18, further comprising a background correction subsystem.

38. The system according to claim 18, further comprising an array alignment subsystem.

39. The system according to claim 18, further comprising a noise measurement subsystem.

40. The system according to claim 18, further comprising a subsystem to calculate parameters for digital image processing filters.

41. The system according to claim 18, further comprising a subsystem to define array boundaries.

42. The system according to claim 18, further comprising a sub-grid identifying subsystem.

43. The system according to claim 42, further comprising a subsystem to align centers on their said identified sub-grids.

44. The system according to claim 43, further comprising a subsystem to reposition the objects on their corresponding said aligned centers on said identified sub-grids.

45. The system according to claim 18, further comprising a noise removal subsystem.

* * * * *